(12) United States Patent
Halstead, Jr.

(10) Patent No.: US 6,919,890 B2
(45) Date of Patent: Jul. 19, 2005

(54) GRID AND TABLE LAYOUT USING ELASTICS

(75) Inventor: Robert H. Halstead, Jr., Belmont, MA (US)

(73) Assignee: Curl Corporation, Cambridge, MA (US)

(*) Notice: Subject to any disclaimer, the term of this patent is extended or adjusted under 35 U.S.C. 154(b) by 748 days.

(21) Appl. No.: 09/965,392

(22) Filed: Sep. 27, 2001

(65) Prior Publication Data

US 2002/0118193 A1 Aug. 29, 2002

Related U.S. Application Data

(60) Provisional application No. 60/236,289, filed on Sep. 28, 2000.

(51) Int. Cl.$^7$ .............................................. G06T 11/20
(52) U.S. Cl. ...................... 345/440; 345/619; 345/815
(58) Field of Search ................................ 345/440, 619, 345/815

(56) References Cited

U.S. PATENT DOCUMENTS

| | | | |
|---|---|---|---|
| 4,608,664 A | | 8/1986 | Bartlett et al. |
| 4,799,172 A | | 1/1989 | Wood et al. ................ 364/518 |
| 5,060,170 A | | 10/1991 | Bourgeois et al. |
| 5,148,520 A | * | 9/1992 | Morgan ....................... 715/506 |
| 5,208,906 A | * | 5/1993 | Morgan ....................... 715/520 |
| 5,237,312 A | * | 8/1993 | Akiyama et al. ............. 345/10 |
| 5,293,475 A | | 3/1994 | Hennigan et al. |
| 5,335,290 A | | 8/1994 | Cullen et al. |
| 5,341,466 A | | 8/1994 | Perlin et al. |
| 5,353,401 A | * | 10/1994 | Iizawa et al. ................ 715/763 |
| 5,371,847 A | * | 12/1994 | Hargrove ..................... 715/788 |
| 5,513,342 A | | 4/1996 | Leong et al. |
| 5,577,187 A | * | 11/1996 | Mariani ....................... 715/792 |
| 5,577,189 A | * | 11/1996 | Gay et al. .................... 715/800 |

(Continued)

FOREIGN PATENT DOCUMENTS

| | | |
|---|---|---|
| EP | 0 821 313 A1 | 1/1998 |
| EP | 0 848 351 A2 | 6/1998 |
| JP | 08287117 | 1/1996 |
| WO | WO 98/36630 | 8/1998 |

OTHER PUBLICATIONS

Haarsley V., et al., "Visualization and Graphical Layout in Object–Oriented Systems," Journal of Visual Languages and' Computing, vol. 3, No. 1, pp. 1–12, Mar. 1992.*

(Continued)

Primary Examiner—Richard Hjerpe
Assistant Examiner—Blake Betz
(74) Attorney, Agent, or Firm—Finnegan, Henderson, Farabow, Garrett & Dunner LLP

(57) ABSTRACT

A system and method of grid layout generates a fiducial graph for a grid or table in a given dimension and uses the fiducial graph to determine size preferences and fiducial positions of the grid and its grid elements along that dimension. Fiducial positions may include origin fiducials of grids and grid elements as well as fiducial positions of attached grid elements. Types of fiducial graphs include series-parallel fiducial graphs and non-series-parallel fiducial graphs (e.g., partially reduced fiducial graphs), which have different algorithms for computing size preferences and fiducial positions.

89 Claims, 12 Drawing Sheets

U.S. PATENT DOCUMENTS

| | | | | |
|---|---|---|---|---|
| 5,636,129 A | * | 6/1997 | Her | 716/12 |
| 5,649,216 A | * | 7/1997 | Sieber | 715/506 |
| 5,712,995 A | * | 1/1998 | Cohn | 715/792 |
| 5,721,848 A | * | 2/1998 | Joseph | 715/764 |
| 5,754,873 A | | 5/1998 | Nolan | 395/789 |
| 5,760,772 A | | 6/1998 | Austin | |
| 5,765,176 A | | 6/1998 | Bloomberg | |
| 5,796,401 A | * | 8/1998 | Winer | 345/619 |
| 5,796,402 A | * | 8/1998 | Ellison-Taylor | 715/792 |
| 5,838,317 A | | 11/1998 | Bolnick et al. | |
| 5,838,318 A | * | 11/1998 | Porter et al. | 715/790 |
| 5,873,106 A | | 2/1999 | Joseph | |
| 5,886,694 A | | 3/1999 | Breinberg et al. | |
| 5,953,735 A | | 9/1999 | Forcier | 707/541 |
| 6,002,446 A | | 12/1999 | Eglit | |
| 6,043,817 A | | 3/2000 | Bolnick et al. | |
| 6,057,842 A | | 5/2000 | Knowlton et al. | 345/348 |
| 6,111,573 A | | 8/2000 | McComb et al. | |
| 6,125,385 A | | 9/2000 | Wies et al. | 709/203 |
| 6,154,757 A | | 11/2000 | Krause et al. | 707/530 |
| 6,181,838 B1 | * | 1/2001 | Knowlton | 382/305 |
| 6,185,589 B1 | | 2/2001 | Votipka | |
| 6,330,004 B1 | | 12/2001 | Matsuzawa et al. | |
| 6,339,434 B1 | | 1/2002 | West et al. | |
| 6,356,279 B1 | | 3/2002 | Halstead, Jr. et al. | 345/619 |
| 6,380,940 B1 | | 4/2002 | Halstead, Jr. et al. | |
| 6,396,500 B1 | | 5/2002 | Qureshi et al. | |
| 6,414,698 B1 | | 7/2002 | Lovell et al. | |
| 6,473,093 B1 | | 10/2002 | Halstead, Jr. et al. | |
| 6,504,544 B1 | | 1/2003 | Hollingsworth et al. | |
| 6,667,750 B1 | | 12/2003 | Halstead, Jr. et al. | |
| 6,750,887 B1 | * | 6/2004 | Kellerman et al. | 715/788 |
| 6,785,866 B1 | | 8/2004 | Lewis et al. | |
| 2002/0111969 A1 | | 8/2002 | Halstead Jr. | |
| 2002/0118193 A1 | | 8/2002 | Halstead Jr. | |
| 2004/0189709 A1 | | 9/2004 | Halstead Jr. | |

OTHER PUBLICATIONS

Linton, Mark A., et al., "Composing User Interfaces With Interviews," IEEE, vol. 22, No. 2, pp. 8–22, Feb. 1, 1989.*

Haarslev, V., et al., "Visualization and Graphical Layout in Object–oriented Systems", *Journal of Visual Languages and Computing, London, GB*, vol. 3, No. 1, Mar. 1998 (Mar. 1902), pp. 1–23, XP000912232.

Eggli, L., et al., "Inferring 3D models from freehand sketches and constraints", *Computer Aided Design, Elsevier Publishers BV.*, Barking, GB, vol. 29, No. 2, (Feb. 1, 1997), pp. 101–112, XP004070873.

Falcidieno, B., et al., "Representing Tolerance Information in Feature–Based Solid Modelling", Eurographics. Hamburg, Sep. 4–8, 1989 *Proceedings of the European Computer Graphics Conference, Amsterdam, North Holland, NL,* vol. Conf. 10, Sep. 4, 1989, pp. 463–476, XP000143272.

Hsu, C., et al, "A constraint–based Manipulator Toolset for Editing 3D Objects", *Proceedings of the Fourth Symposium on Solid Modeling and Applications, Atlanta, GA, May 14–16, 1997, Proceedings of the Symposium on Solid Modeling and Applications, New York, ACM, US,* vol. SYMP. 4, May 14, 1997, pp. 168–180, XP00724303.

Roy, U., et al., "Review of dimensioning and tolerancing: representation and processing", *Computer Aided Design, Elsevier Publishers BV.*, Barking, GB, vol. 23, No. 7, Sep. 1, 1998, pp. 466–483, XP000236525.

Myers, Brad, A., et al., "Garnet Comprehensive Support for Graphical Highly Interactive User Interfaces," IEEE, vol. 23, No. 11, pp. 71–85, Nov. 1, 1990.

Haarslev V., et al., "Visualization and Graphical Layout in Object–Oriented Systems," Journal of Visual Languages and Computing, vol., 3, No. 1, pp. 1–12, Mar. 1992.

Linton, Mark, A., et al., "Composing User Interfaces With InterViews," IEEE, vol., 22, No. 2, pp. 8–22, Feb. 1, 1989.

"Scripting Languages: Automating the Web," *World Wide Web II*(2) , Spring 1997, http://www.w3j.com/6/ (downloaded Jul. 27, 1999).

Knuth, D.E., *The TeXbook, (Addison Wesley, 1998)*.

Hostetter, M., et al., "Curl, A Gentle Slope Language for the Web," *World Wide Web Journal* (Spring, 1997) , http://www.w3journal.com/6/s3.kranz.html (downloaded Jan. 22, 2002).

"Graphic.curl," http://cag.Ics.mit.edu/curl/curl/boxes/graphic.curl,downloaded Nov. 3, 2004 (21 pages.).

"Index of/curl/curl," http://www.cag.Ics.mit.edu/curl/curl/, downloaded Nov. 3, 2004 (1 page.).

"Method for Formatting Optical Character Reader Texts," *IBM Technical Disclosure Bulletin*, 38:1 (195–198) Jan. 1995.

Norton, H. and J.L. Olberding, "Nested Descriptor Blocks for Defining the Layout of a Formatted Page," *IBM Technical Disclosure Bulletin*, 14:5 (1536–1541) Oct. 1971.

* cited by examiner

| TEAM | | RECORD | |
|---|---|---|---|
| | | W | L |
| AL EAST | YANKEES | 78 | 57 |
| | BOSTON | 72 | 63 |
| | TORONTO | 71 | 67 |
| | BALTIMORE | 63 | 75 |
| | TAMPA BAY | 59 | 79 |
| AL CENTRAL | WHITE SOX | 82 | 56 |
| | CLEVELAND | 74 | 61 |
| | DETROIT | 70 | 67 |
| | KANSAS CITY | 65 | 73 |
| | MINNESOTA | 60 | 78 |

Figure 1

| CHANNEL | 8:00 PM | 8:30 PM | 9:00 PM | 9:30 PM |
|---|---|---|---|---|
| 2 | LIVING EDENS | | AUSTRALIA | |
| 5 | TWO GUYS | NORM | DREW CAREY | SPIN CITY |
| 9 | KING OF THE HILL | FAMILY GUY | GUINNESS WORLD RECORDS | |
| 12 | ASK THE FAMILY DOCTOR | | HEALTH POINT | MEDICAL REPORT |
| 33 | FUGITIVES | THE SUBURBANS | | |
| 40 | HORSE SENSE | | HOUSE TOUR | WEIRD STEPSISTER |
| 41 | MY FAVORITE LIFE | | SPORTS | NEWS | WOW! | PEOPLE |

Figure 2

GRID AND TABLE LAYOUT USING ELASTICS

RELATED APPLICATIONS

This application claims the benefit of U.S. Provisional Application No. 60/236,289, filed on Sep. 28, 2000. The entire teachings of the above application are incorporated herein by reference.

BACKGROUND OF THE INVENTION

In recent years, the number of users on the internet has increased exponentially. With this increase in popularity, there has also come an increased demand for tools which enhance the "on line experience." To this end, new object oriented computer programming languages such as Java™ have been developed. While these languages are an advance over prior technology, there is still room for improvement, particularly in the ability to efficiently modify layout of complex structures of graphical objects in variable sized windows. It is difficult to implement high quality, real time graphics on a web site using these languages.

Java allows minimum and maximum sizes to be specified for graphical objects and uses those values in a way that causes objects to act more stretchy when the differences between their minimum and maximum sizes is large.

A language explicitly developed for internet applications is the MIT Curl Language by M. Hostetter et al, "Curl: A Gentle Slope Language for the Web," *WorldWideWeb Journal*, Vol II. Issue 2, O'Reilly & Associates, Spring 1997. Embodiments of the present invention extend the Curl language. (The language of this embodiment of the present invention will be referenced as "Curl" and is to be distinguished from the prior "MIT Curl" language.) MIT Curl used a three-pass layout negotiation scheme and allowed objects to describe their size preferences in terms of a minimum size and a stretchiness coefficient.

TeX is a widely used text formatting program developed by Donald Knuth. Donald E. Knuth, *The TeXBook*, Addison-Wesley, Reading, Mass., 1984. TeX uses a concept known as "glue" to express dimensional preferences of fill objects and incorporates different stretch and compression orders that can be used to describe the stretchiness and compressibility of different kinds of fill objects. As the overall dimensions of a layout change, the dimensions of individual fill objects change dependent on preferred sizes and stretchiness of those objects.

A graphics tool kit developed by Robert Halstead called Stk incorporates the concept of an elastic, known as "glue," having a minimum size, a stretchiness coefficient and a stretch order associated with graphical objects having content. The tool kit formalizes the layout computations of horizontal and vertical boxes of graphical objects in terms of elastic add, max and divide operations. Stk is not widely known or used. The layout mechanism of Stk was incorporated into Swat, a graphics toolkit developed at MIT by Harold Abelson, James Miller and Natalya Cohen.

SUMMARY OF THE INVENTION

The elements of grids and tables are arranged by associating designated points in the elements, such as the elements' edges or origins, with horizontal or vertical reference lines, called fiducials. All points associated with a given horizontal fiducial lie on the same horizontal line, while all points associated with a given vertical fiducial lie on the same vertical line.

Embodiments of a grid and table layout using elastics include generating a fiducial graph for a grid in a given dimension. According to one embodiment, the fiducial graph for a dimension is a directed graph whose nodes correspond to fiducials and whose arcs are associated with the Elastic objects representing size preferences of grid elements that are attached to the corresponding fiducials. A size preference includes a size and elastic properties. Elastic properties may comprise stretch and compression properties. The fiducial graph is traversed, combining the size preferences of the constraints into a size preference for the grid in the given dimension. With the size preference of the grid calculated, a grid size is assigned. Positions are assigned to each grid fiducial by traversing the fiducial graph and dividing the grid size among the constraints. The resulting sizes of the constraints are, thus, used to define the positions of the grid fiducials in the given dimension.

Types of fiducial graphs include series-parallel fiducial graphs and non-series-parallel fiducial graphs (e.g., partially reduced fiducial graphs). With series-parallel fiducial graphs, constraints can be grouped into a series-parallel composition tree having a root constraint. Non-series parallel fiducial graphs may have some series-parallel structure, but may be, at most, partially reduced. The algorithms for computing size preferences and fiducial positions are, therefore, different.

For series-parallel fiducial graphs, a size preference for a grid is determined by computing a size preference for each parallel and series constraint in the fiducial graph, culminating with a size preference for the root constraint, which is also the size preference for the grid. In particular, the size preference for each parallel constraint is computed by applying a max operation to the size preferences of the constraints grouped within the parallel constraint, while the size preference for each series constraint is computed by applying an add operation to the size preferences of the constraints grouped within the series constraint.

For series-parallel fiducial graphs, positions are assigned to fiducials by dividing the grid size among each parallel and series constraint using a divide operation. In particular, the size allocated to a constraint grouped within a parallel constraint is the size allocated to the parallel constraint. The size allocated to a constraint grouped within a series constraint is computed by applying the divide operation to size preferences of constituent constraints within the series constraint and to the overall size allocated to the constituent constraints. Positions are then assigned to a fiducial such that the distance between the fiducial and a head fiducial of a corresponding constraint is the size of the constraint.

For non-series-parallel fiducial graphs, a size preference for the grid is determined by assigning an initial size preference to each fiducial in the fiducial graph and traversing constraints in forward and reverse traversals accumulating size preferences at each fiducial. Depending on the direction of the traversal, size preferences may be added or subtracted, as described herein with more detail. A designated fiducial, such as the head or tail fiducial of the grid, is assigned an initial size preference having rigid elastic properties. The non-designated fiducials are assigned initial size preferences having stretchy elastic properties. Traversal of the fiducial graph then results in an accumulated size preference between each fiducial and the designated fiducial. Thus, if the designated fiducial is the head fiducial of the grid, the size preference of the grid is the accumulated size preference at the tail fiducial of the grid. Conversely, if the designated fiducial is the tail fiducial of the grid, the size preference of the grid is the accumulated size preference at the head fiducial of the grid. Embodiments may also include back-links, marking, and sorting in order to ensure termination of the computation and provide more efficient and accurate computations of size preferences.

For non-series-parallel fiducial graphs, assigning positions to grid fiducials includes assigning positions to the head and tail fiducials of the grid and recomputing the accumulated size preferences at each fiducial, taking into account the fixed positions of the head and tail fiducials. Fiducial positions are then computed and assigned in order such that a fiducial position is not computed until a position is computed for each non-assigned successor fiducial in critical chains extending from the fiducial.

In particular, fiducial positions are computed by dividing the grid size between two size preferences resulting in an allocated size. The first size preference is the size preference between the non-assigned fiducial and the head fiducial of the grid, while the second size preference is the size preference between the non-assigned fiducial and the tail fiducial. The resulting allocated size is the distance between the head fiducial and the non-assigned fiducial. Thus, a fiducial position is assigned to the non-assigned fiducial such that the distance between the non-assigned fiducial and the head fiducial is the allocated size. However, if certain layout rules are violated, the fiducial position may be constrained to take into account relative fiducial positions and minimum size constraint requirements.

Embodiments of the invention may be extended to include origin fiducials which may specify the origin of a grid element or the grid itself.

BRIEF DESCRIPTION OF THE DRAWINGS

FIG. 1 is a table including entries that span rows and columns.

FIG. 2 is a table including complex column-spanning relationships.

Figure 3:
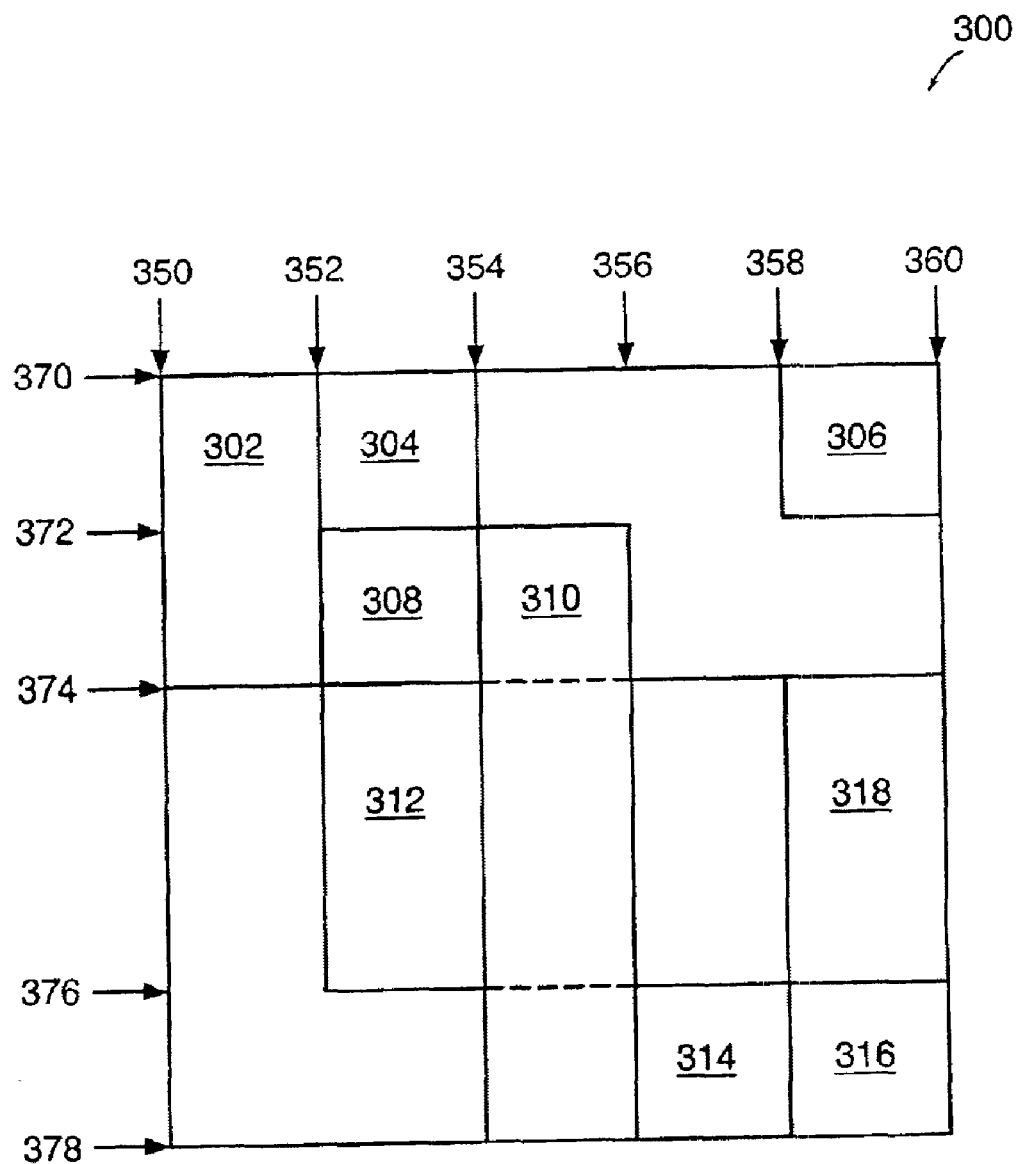
FIG. 3 is a grid having overlapping elements.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The Curl programming language facilitates the layout of many different types of graphical objects. Size preferences comprising distinct stretch and compression properties are defined for unit graphical objects with content. Those properties are processed to define individual layouts of the graphical objects within an overall graphical layout. The preferred data structure defining size preferences is called an elastic and comprises a size value, a stretch property, and a compression property independent of the stretch property. Processing is facilitated by associating the elastics directly with unit graphical objects having content as opposed to being associated merely with fill objects which surround the content objects.

Preferably, the stretch properties comprise stretchiness coefficients to be applied to sizes designated for the graphical objects, and the compression properties comprise compressibility coefficients to be applied to the sizes designated for the graphical objects. The stretch and compression properties may comprise stretch and compression orders to indicate substantial relative differences between stretchiness and compressibility relative to those properties of other graphical objects. Stretch and compression properties of the graphical objects may also be defined through compact representations which share like stretch and compression properties.

Preferably, the data structures defining elastics of the graphical objects define minimum and preferred sizes of the graphical objects, and those minimum and preferred sizes are processed to define the individual layouts.

Various operations can be applied to the graphical objects. In an add operation, the stretchiness and compressibility coefficients of plural graphical objects are summed dependent on the relative stretch and compression orders. Specifically, the stretchiness and compressibility coefficients, respectively, are summed if the respective stretch and compression orders are equal, and if the respective stretch and compression orders are not equal, an add result includes the stretchiness and compressibility coefficients of the graphical object indicated to be most elastic by the stretch and compression orders. The stretch and compress orders, respectively, having the greatest elasticity may be taken as the order of properties of the add result.

In a max operation, a size is selected from two graphical objects dependent on the relative compressibility and stretchability of the graphical objects. A max result is the size of the graphical object whose elasticity toward the other size is the least. The stretch and compression properties of the max result are selected from the graphical object from which size was selected or, if the size of the two graphical objects is the same, from the graphical object which was least elastic.

A divide operation can be applied to two elastics and a length. It computes the portion of the length that should be apportioned to each elastic if the two elastics were placed end to end and that assembly stretched or compressed to take on the specified length. Such elastic operations (e.g., add, max, and divide) may be utilized in embodiments of the invention for processing grids and tables for graphical layout.

When presenting information graphically, it is frequently desirable to present information in a tabular form. Such a presentation organizes data and/or graphics into rows and columns. It is frequently desirable for some of the data to span multiple rows and columns. FIG. 1 is a table including entries that span rows and columns.

FIG. 1 can be viewed as a table 100 containing twelve rows and four columns, but several elements span multiple rows or columns. For example, the element 110 containing "Record" spans two columns, the element 120 containing "AL East" spans five rows, and the entry 130 containing "Team" spans two rows and two columns.

Depending on the content of a table, the structure of row/column spanning relationships can vary greatly. For example, an evening's lineup of television programs can be presented in a tabular display such as that of FIG. 2. FIG. 2 is a table 200 including complex column-spanning relationships.

It is desirable to provide the capability to produce tabular displays such as those illustrated in FIGS. 1 and 2 when using a layout system based on elastics. U.S. patent application Ser. No. 09/364,470, now U.S. Pat. No. 6,667,750, entitled "Multiple Pass Layout of Graphical Objects with Elastics" filed Jul. 30, 1999 by Halstead et. al., is an example of a preferred layout system based on elastics, the entire teachings of which are incorporated herein by reference. In such a system, the preferred sizes and elasticities of each table element are described using Elastic objects. Based on this information, the layout system must:
1. Compute the preferred sizes and elasticities of the table itself.
2. Compute the size and position of the space allocated to each table element, after being provided with information about the size and position allocated for displaying the table as a whole.

If these two computations are supported, then tables themselves can participate as full-fledged graphical objects in the layout protocol. For example, such tables can be used within other objects, including other tables, and can contain any arbitrary graphical objects, including both rigid and stretchable objects.

Fiducials and Grids

In general, a container object, such as a table, arranges its contained elements by associating designated points in the elements, such as the elements' edges or origins, with horizontal or vertical "fiducials." The container arranges the elements so that all points associated with a given horizontal fiducial lie on the same horizontal line, while all points associated with a given vertical fiducial lie on the same vertical line.

The layout of tables such as those in FIGS. 1 and 2, and in fact of any tables based on rows, columns, and spanning, can be described by associating a vertical fiducial with each boundary between columns and a horizontal fiducial with each boundary between rows. Vertical fiducials are also associated with the left and right edges of the table, and horizontal fiducials are associated with its top and bottom edges. The edges of each table element are then associated with the fiducials that correspond to the boundaries of the row and column where the element starts or ends.

While all tables can be described as arrangements of objects constrained by fiducials, the fiducial model is in fact more general and, for example, allows arrangements in which elements overlap partially or completely. Such arrangements can be useful in specialized situations. The term "grid" represents a graphical container that allows the arrangement of its contained elements to be specified in terms of fiducials, allowing for the possibility of overlap. Tables can be built as a special case of grids in which fiducials mark the boundaries of rows and columns, while elements are associated with fiducials in a way that causes no overlap. Accordingly, the remainder of this discussion focuses on the layout computations for grids with the extension to tables being performed as described in this paragraph.

FIG. 3 is a grid having overlapping elements. The grid 300 contains an element 312 that is partially occluded by the overlapping element 310. FIG. 3 also shows the location of vertical fiducials 350, 352, 354, 356, 358, and 360, as well as horizontal fiducials 370, 372, 374, 376, and 378. Thus, the edges of the element 312 are aligned with the fiducials 352, 358, 374, and 376, while the edges of the element 310 are aligned with the fiducials 354, 356, 372, and 378. The grid 300 also contains some regions that are not covered by any element. Such empty regions may exist both in grids and in tables.

Layout Basics

The width-first three-pass layout algorithm using elastics, as described in U.S. patent application Ser. No. 09/364,470 entitled "Multiple Pass Layout of Graphical Objects with Elastics," proceeds through the following:
1. Compute width preferences of all objects.
2. Assign widths to all objects and compute their height preferences.
3. Assign heights to all objects.

Throughout this discussion, terms such as "width preference," "height preference," and "size preference" include both the preferred sizes and the elasticities of the objects in question.

The height-first three-pass layout algorithm is similar to the width-first algorithm but interchanges the roles of width and height. Without loss of generality, this discussion focuses on the width-first algorithm. To participate in this algorithm, a grid must be able to:
1. Compute its width preference based on the width preferences of its elements.
2. Assign widths to its elements based on the grid's own width allocation and the width preferences of the elements.
3. Compute its height preference based on the height preferences of its elements.
4. Assign heights to its elements based on the grid's own height allocation and the height preferences of the elements.

It can be seen that there are really two fundamental operations here:
a. Compute the size preference of the grid in a given dimension, based on the size preferences of the grid's elements in that dimension.
b. Assign sizes to grid elements in a given dimension, based on the grid's size allocation in that dimension and the elements' size preferences in that dimension.

Because elastics provide a very general description of size preferences, these operations result in a potentially complex set of constraints that must be solved when laying out a grid. One important simplification, however, is that the width and height computations can be conducted completely independently in the grid layout algorithms. In other words, the computation of the grid's width preference and of the width allocations of grid elements can be conducted completely independently of any information about height preferences or height allocations. Accordingly, the following discussion focuses on computations in just a single dimension (i.e., width or height).

Fiducial Graphs

Figure 4:
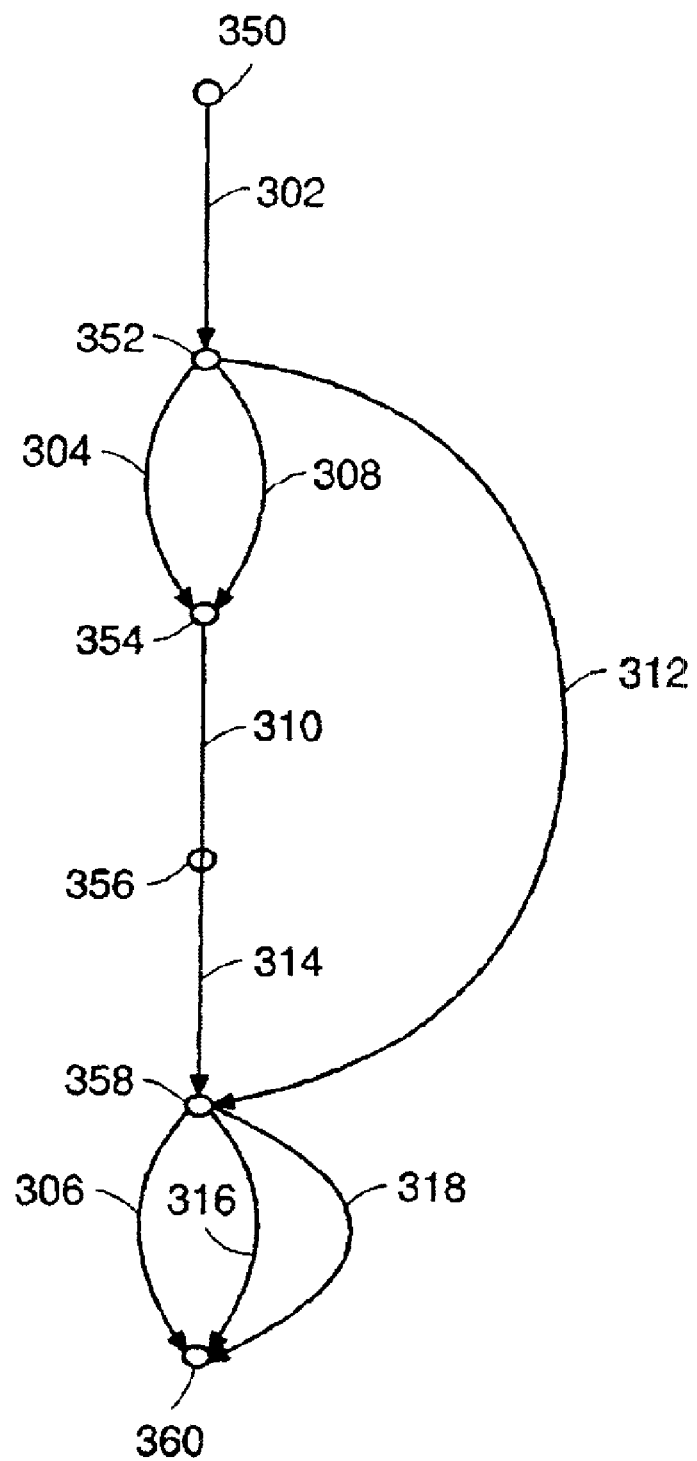
FIG. 4 is a fiducial graph for the horizontal dimension of the grid of FIG. 3 according to one embodiment.
Figure 5:
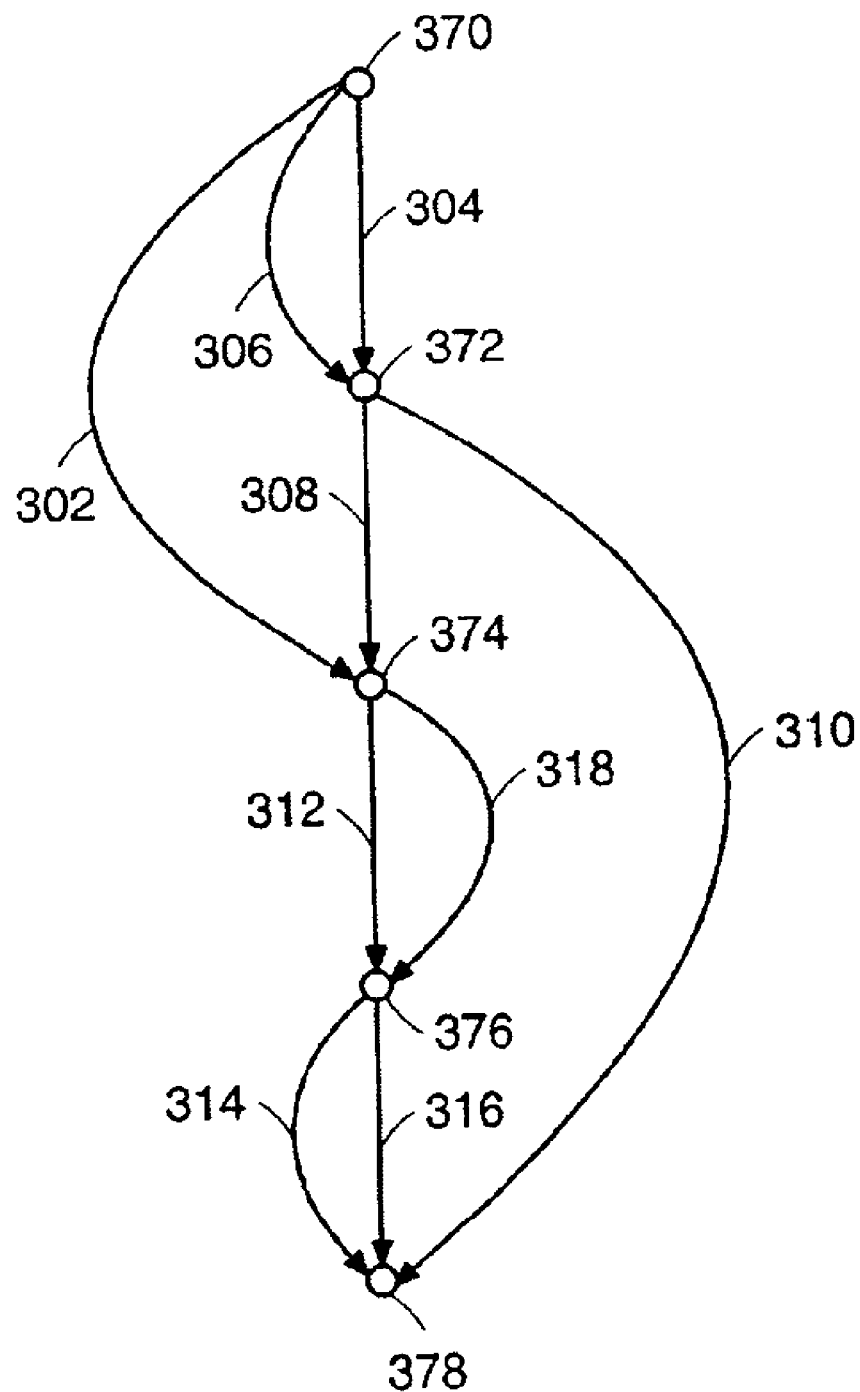
FIG. 5 is a fiducial graph for the vertical dimension of the grid of FIG. 3 according to one embodiment.

The first step in organizing the layout computations for a particular dimension of a grid is to construct a "fiducial graph" for that dimension. FIGS. 4 and 5 are the fiducial graphs for the horizontal and vertical dimensions, respectively, of the grid 300 shown in FIG. 3. According to one embodiment, the fiducial graph for a dimension is a directed graph whose nodes correspond to fiducials and whose arcs correspond to the Elastic objects representing size preferences of grid elements that are attached to the corresponding fiducials. Referring to FIGS. 4 and 5, each arc is labeled with the number of the grid element to which it corresponds. It must be understood that each arc in FIG. 4 is also associated with the width Elastic of the indicated element, and similarly each arc in FIG. 5 is also associated with the height Elastic of the indicated element.

Every fiducial graph has a single "head node" that corresponds to the left or top edge of the grid (depending on whether the graph is for the horizontal or vertical dimension of the grid) and a single "tail node" that corresponds to the right or bottom edge of the grid. Every node in the fiducial graph must be a successor of the head node and must be a predecessor of the tail node. If any fiducial would not be a successor of the head node, it is made to be a successor of the head node by adding an extra arc from the head node to that fiducial. This arc is associated with an Elastic whose elasticity is greater than that of any possible grid element, so that the existence of this arc does not unnecessarily constrain the layout of elements in the grid. An analogous technique is used to ensure that every fiducial is a predecessor of the tail node.

Figure 6A:
FIG. 6A is a basic series-parallel graph referred to as a leaf graph according to one embodiment.
Figure 6B:
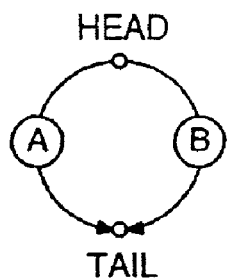
FIG. 6B is a parallel composition of two series-parallel graphs according to one embodiment.
Figure 6C:
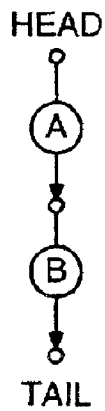
FIG. 6C is a series composition of two series-parallel graphs according to one embodiment.

The layout computations for a grid dimension are simplified when the fiducial graph for that dimension has a series-parallel structure. FIGS. 6A, 6B, and 6C illustrate the structure of a several series-parallel graphs. A fiducial graph is a series-parallel graph if and only if it has a single head node and a single tail node and is described by one of the following three cases:

1. The graph has a single arc leading from the head node to the tail node.

Such a graph is referred to as a "leaf graph" and is illustrated in FIG. 6A.

2. The graph can be constructed from two series-parallel graphs by identifying their two head nodes with the head node of the combined graph and by identifying their two tail nodes with the tail node of the combined graph. Such a combination is referred to as the "parallel composition" of two series-parallel graphs and is illustrated in FIG. 6B.

3. The graph can be constructed from two series-parallel graphs A and B by identifying the head node of A with the head node of the combined graph, identifying the tail node of A with the head node of B, and identifying the tail node of B with the tail node of the combined graph. Such a combination is referred to as the "series composition" of two series-parallel graphs and is illustrated in FIG. 6C.

It can be seen that the fiducial graph of FIG. 4 is a series-parallel graph, but the fiducial graph of FIG. 5 is not. The fiducial graph of FIG. 5 is not a series-parallel graph because the configuration of arcs 302, 308, and 310 cannot be achieved through any number of parallel or series composition steps. (FIG. 5 could have been a series-parallel graph if any one of these three arcs had been removed.)

Most tables encountered in practice, even if they contain elements that span rows and/or columns, have series-parallel fiducial graphs in both dimensions. The table 100 in FIG. 1 provides a typical example of this phenomenon. However, it is possible to construct tables that do not have this property. The horizontal dimension of the table 200 in FIG. 2 has a fiducial graph that is not a series-parallel graph.

Computing the Series-Parallel Decomposition of Series-Parallel Graphs

Since layout computations on a fiducial graph are simplified when the graph has a series-parallel structure, the first step in preparing a grid for layout computations is to analyze its fiducial graphs to see whether they have a series-parallel structure. If a fiducial graph does have a series-parallel structure, then the details of this structure need to be analyzed and recorded so that they can be used in subsequent layout computations. If the graph is not a series-parallel graph, it is still advantageous to identify the largest subgraphs that have a series-parallel structure, which will simplify the layout computations for those parts of the fiducial graph.

Figure 7:
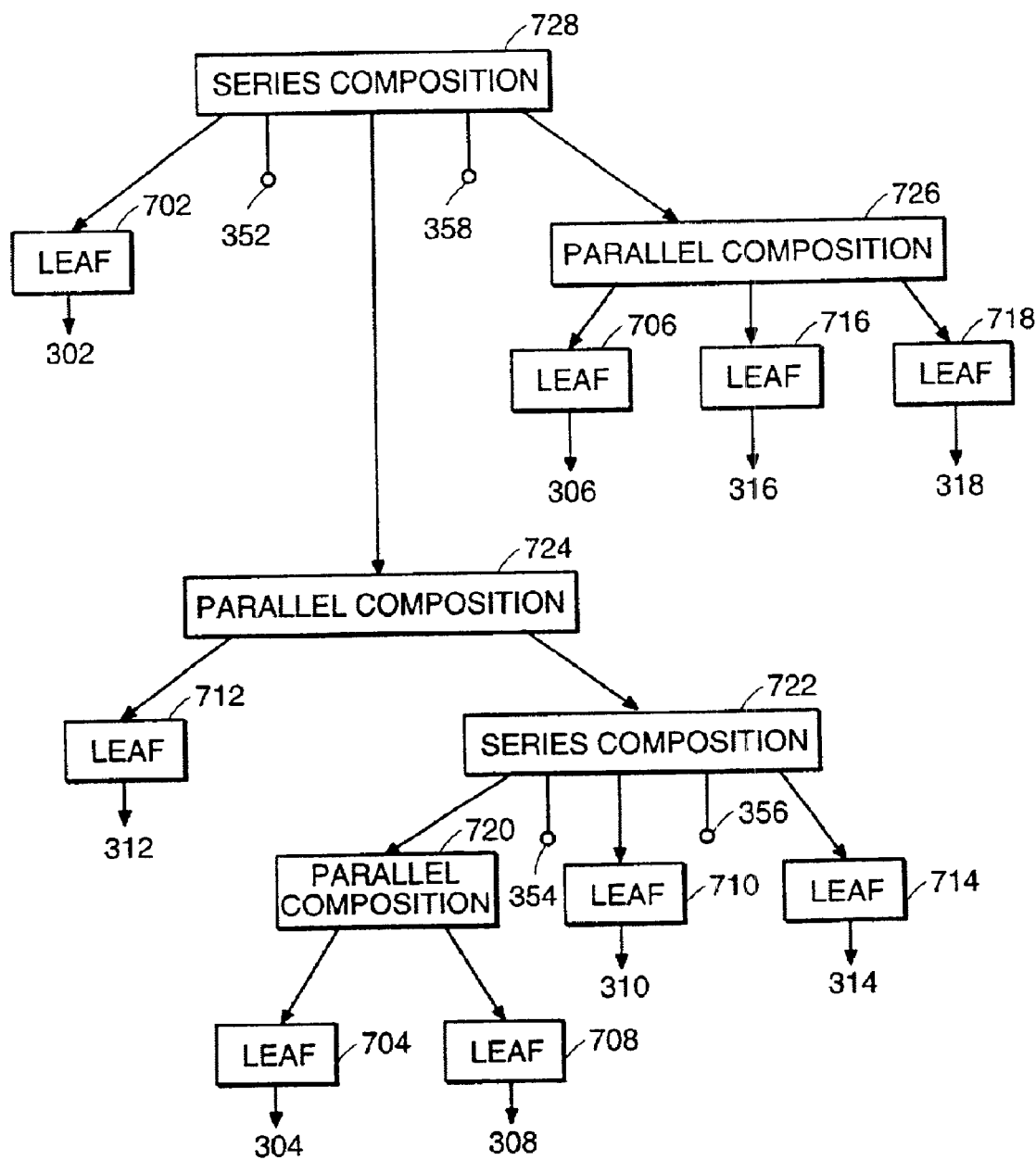
FIG. 7 is a series-parallel composition tree for the fiducial graph of FIG. 4 according to one embodiment.

The results of analyzing the structure of a series-parallel graph are represented as a "series-parallel composition tree." FIG. 7 is a series-parallel composition tree for the fiducial graph of FIG. 4 according to one embodiment. This tree shows how to build up the graph structure of FIG. 4 by starting with a leaf graph corresponding to each arc in FIG. 4 and then applying a sequence of parallel and series composition steps.

Each tree node in a series-parallel composition graph is referred to as a "constraint." FIG. 7 shows three types of constraints: Leaf constraints, Parallel Composition constraints, and Series Composition constraints. Each Leaf constraint in FIG. 7 corresponds to a single arc in FIG. 4. Each Parallel Composition constraint corresponds to a parallel composition step applied to the graphs corresponding to the children of the Parallel Composition constraint. Thus, the Parallel Composition constraint 720 represents the parallel composition of the two leaf graphs in FIG. 4 that contain the arcs 304 and 308. These leaf graphs are in turn represented in FIG. 7 by the Leaf constraints 704 and 708, respectively. Similarly, the Parallel Composition constraint 724 represents the parallel composition of the leaf graph represented by Leaf constraint 712 and the subgraph represented by Series Composition constraint 722. The parallel composition operation can be generalized in the obvious way to apply to more than two subgraphs. For example, the Parallel Composition constraint 726 represents the parallel composition of the three leaf graphs containing arcs 306, 316, and 318.

Series Composition constraints in FIG. 7 likewise represent the series composition of subgraphs. Furthermore, Series Composition constraints can likewise be generalized in the obvious way to apply to more than two subgraphs. Since a series composition has one or more internal nodes that are neither a head nor a tail for the series-composition graph as a whole, the Series Composition constraints in FIG. 7 indicate not only the identities of their subgraphs but also the identities of their internal nodes. For example, the Series Composition constraint 722 in FIG. 7 has internal nodes 354 and 356 and contains the subgraphs represented by Parallel Composition constraint 720, Leaf constraint 710, and Leaf constraint 714. Internal node 354 is the tail node of the subgraph represented by Parallel Composition constraint 720 and is the head node of the subgraph represented by Leaf constraint 710. Similarly, internal node 356 is the tail node of the subgraph represented by Leaf constraint 710 and is the head node of the subgraph represented by Leaf constraint 714.

The algorithm for deriving a series-parallel composition tree such as that in FIG. 7 from a fiducial graph such as that in FIG. 4, according to one embodiment, operates as follows:

Algorithm 1

1. Replace each arc in the fiducial graph by a Leaf constraint that corresponds to that arc.
2. Determine whether there are any groups of two or more constraints in the fiducial graph that have the same head and tail nodes. If such a group of constraints is found, construct a Parallel Composition constraint that contains the constraints in the group. Remove the group of constraints from the fiducial graph and replace them with the Parallel Composition constraint. Repeat this step (2) until no further Parallel Composition nodes can be constructed, then proceed to step (3).
3. Determine whether there is a node N in the fiducial graph that serves as the tail for a single constraint A and as the head for a single constraint B. If so, construct a Series Composition constraint containing the constraints A and B and having N as an internal node. The head node of this Series Composition constraint will be the head node of A and the tail node of this Series Composition constraint will be the tail node of B. Remove the constraints A and B and the node N from the fiducial graph and replace them with the Series Composition constraint. Go back to step (2).
4. When no further cases of the types described in steps (2) and (3) can be found, the algorithm terminates.

As an optimization, while constructing a Series Composition constraint in step (3) above, the algorithm can check whether any of the constraints to be contained by the newly constructed Series Composition constraint is also a Series Composition constraint. In such a case, the contents of the already existing Series Composition constraint can be expanded into the newly constructed Series Composition constraint, so that the contents of the existing constraint are directly contained in the newly constructed constraint and the existing constraint is no longer needed. In this way, the creation of a Series Composition constraint that directly contains another Series Composition constraint is avoided. Instead Series Composition constraints are created, such as Series Composition constraints 722 and 728 in FIG. 7, that directly contain more than two other constraints.

A similar optimization is possible when constructing Parallel Composition constraints. In any situation where the algorithm might construct a Parallel Composition constraint that directly contains another Parallel Composition constraint, the contents of the latter Parallel Composition constraint can instead be incorporated directly into the newly constructed Parallel Composition constraint.

Steps (2) and (3) in the above algorithm simplify the fiducial graph by reducing the number of constraints. Step (3) additionally simplifies the fiducial graph by reducing the number of nodes. If the fiducial graph is a series-parallel graph, then the final configuration of the fiducial graph after applying the above algorithm will contain just a head node, a tail node, and a constraint that represents the series-parallel structure of the original fiducial graph. This resulting constraint can be used for computing the grid's size preference and allocating space to the grid elements represented by the arcs in the original fiducial graph.

Computing Size Preferences Using Series-Parallel Fiducial Graphs

The size preference for a grid dimension corresponding to a series-parallel composition tree can be calculated easily by beginning with the Leaf constraints at the leaves of the tree and working up toward the root of the tree. The calculation begins by determining the size preference (comprising both preferred sizes and elasticities) of each element of the grid along the grid dimension of interest (either width or height). A size preference is associated with each constraint in the series-parallel composition tree. The size preference associated with a Leaf constraint is equal to the size preference of the grid element corresponding to that Leaf constraint. The size preference associated with each other constraint is computed as a function of the size preferences associated with the constraints directly contained in it.

Algorithm 2

The size preference associated with a Parallel Composition constraint is computed by applying the Elastic max operation to the size preferences associated with the constraints directly contained within the Parallel Composition constraint. For a description of the Elastic max operation, see U.S. patent application Ser. No. 09/364,470, now U.S. Pat. No. 6,667,750, entitled "Multiple Pass Layout of Graphical Objects with Elastics."

The size preference associated with a Series Composition constraint is computed by applying the Elastic add operation to the size preferences associated with the constraints directly contained within the Series Composition constraint. For a description of the Elastic add operation, see U.S. patent application Ser. No. 09/364,470, now U.S. Pat. No. 6,667,750, entitled "Multiple Pass Layout of Graphical Objects with Elastics." As a by-product, this computation sets the elements of an "upto-elastics" array associated with the Series Composition constraint. upto-elastics[i] (the i'th element of the array) is set equal to the Elastic sum of the size preferences for the first i+1 of the constraints directly contained within the Series Composition constraint.

The overall size preference of the grid along the dimension of interest is just the size preference that is computed by this algorithm as being associated with the root constraint in the series-parallel composition tree for that dimension.

Allocating Space Using Series-Parallel Fiducial Graphs

When layout algorithms allocate an actual size to a grid dimension, the grid's own layout processing must calculate sizes and positions along that dimension for all of the grid elements. Thus, a position must be calculated for each fiducial in that dimension's fiducial graph. Since each edge of every element in the grid is associated with a fiducial, the fiducial positions determine the element positions and the size of an element can be calculated as the difference between the positions of the two fiducials that are associated with the element's two edges along that dimension.

The allocation algorithm may be viewed as a recursive walk of the series-parallel composition tree in which a method "set-fiducials" is called on each constraint in the tree after specifying the positions (relative to the grid's coordinate system) of the head and tail fiducials associated with the constraint of interest. The operation of this method for the three types of constraints is as follows.

Algorithm 3

For a Leaf constraint, no operation is performed.

For a Parallel Composition constraint, the "set-fiducials" method is called on each constraint that is directly contained in the Parallel Composition constraint.

For a Series Composition constraint, a more complex calculation is performed and is discussed in more detail with respect to Algorithm 4.

With respect to Series Composition constraints, this calculation fixes the position of each fiducial directly contained in the Series Composition constraint and then calls the "set-fiducials" method on each constraint directly contained in the Series Composition constraint.

To describe in more detail the calculation performed to allocate space in a Series Composition constraint, it is useful to describe the fields of the object representing a Series Composition constraint. According to one embodiment, these fields include the following:

"components" is an array containing the constraint objects that are directly contained in the Series Composition constraint. As with all arrays mentioned in this description, zero is the index of the first array element.

"upto-elastics" is an array of Elastic objects, whose contents have been described above.

Algorithm 4

According to one embodiment, the calculation on a Series Composition constraint C proceeds as follows:

1. Let n be the number of constraints directly contained in C.
   Let i be n−2.
   Let start be the position assigned to the head fiducial of C.
   Let end be the position assigned to the tail fiducial of C.
   Let len be end—start.
2. If i>=0 then perform the following:
   Let cc be C.components[i+1].
   Let e be the Elastic associated with the constraint cc.
   Let upto be C.upto-elastics[i].
   Let new-len be divide(upto, e, len); in other words, apply the Elastic divide operation to upto, e, and len. For a description of the Elastic divide operation, see U.S. patent application Ser. No. 09/364,470, now U.S. Pat. No. 6,667,750, entitled "Multiple Pass Layout of Graphical Objects with Elastics."
   Let f be the head fiducial of cc.
   Set the position of f to be start+new-len.
   Set len to new-len.
   Set i to i−1.
   Return to step (2).
3. For each constraint cc in C.components, call {cc.set-fiducials}.

Non-Series-Parallel Fiducial Graphs

For fiducial graphs, such as the graph in FIG. 5, that are not series-parallel graphs, Algorithm 1 terminates without reducing the fiducial graph to a single constraint. The algorithms specified in Algorithm 2, 3 and 4 cannot be applied directly in this situation. This situation is substantially more complex than the series-parallel situation because there is no easily determined order, analogous to the bottom-up tree traversal of Algorithm 2, for performing Elastic operations that is guaranteed to produce an acceptable result.

Figure 8:
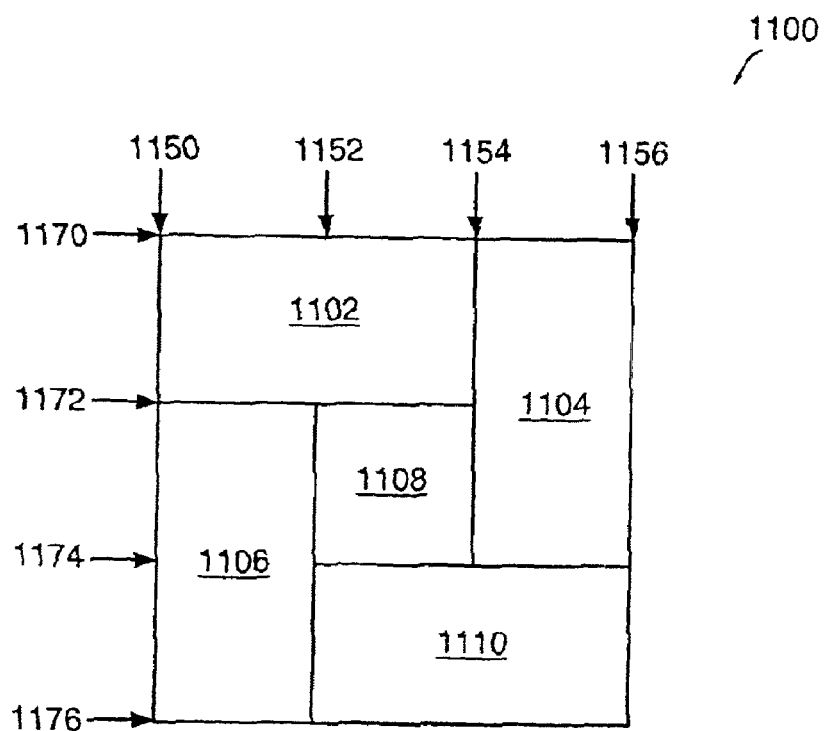
FIG. 8 is a simple grid topology that yields non-series-parallel fiducial graphs.
Figure 9:
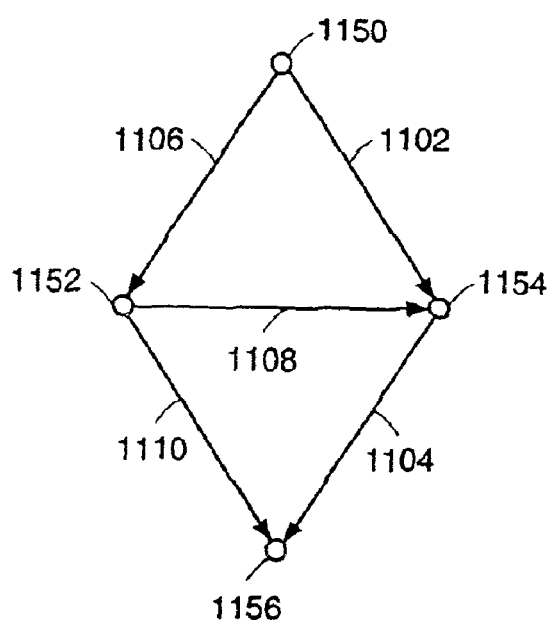
FIG. 9 is the non-series-parallel fiducial graph corresponding to the horizontal dimension of the grid of FIG. 8 according to one embodiment.

FIG. 8 is a simple grid topology that yields non-series-parallel fiducial graphs. FIG. 9 is the non-series-parallel fiducial graph corresponding to the horizontal dimension of the grid 1100 of FIG. 8. This topology serves as a useful framework for discussing the problems that arise in such a case. As an example of the complexities that attend the process of laying out grids with this sort of topology, consider the case where the grid elements 1102, 1108, and 1110 have the same low degree of elasticity, while the elements 1104 and 1106 have a high degree of elasticity. Assume further that the preferred width of element 1108 is less than those of elements 1102 and 1110. In this case, the preferred width of the grid 1100 will equal the sum of the preferred widths of elements 1102 and 1110, minus the preferred width of element 1108. If, however, the preferred width of element 1108 is greater than that of element 1102, then the preferred width of the grid 1100 will equal the greater of the preferred widths of the elements 1108 and 1110.

In another case, where elements 1106, 1108, and 1104 have the same low degree of elasticity, while elements 1102 and 1110 have a high degree of elasticity, the outcome is quite different. In this case the preferred width of grid 1100 will equal the sum of the preferred widths of elements 1106, 1108, and 1104.

This discussion shows that, depending on the relative preferred widths and elasticities of the different elements of the grid 1100, the preferred width of element 1108 is sometimes added to and sometimes subtracted from the preferred width of the grid 1100. In other situations, such as when the element 1108 has a high degree of elasticity, the preferred width of element 1108 will not even enter into the calculation of the preferred width of the grid 1100.

It would be appealing to formulate the size preference calculations on a grid as a unidirectional traversal of the grid's fiducial graph from the head node to the tail node, always traversing the arcs in the forward direction and somehow accumulating Elastic values as we go. In the case of the fiducial graph in FIG. 9, such a procedure would entail visiting the graph nodes in the order 1150, 1152, 1154, and finally 1156.

However, the examples given above show that it is not always correct to proceed in this "forward" direction from the graph's head node to its tail, accumulating size preferences. Depending on the relative elasticities and preferred sizes of the objects in the grid, the most rigidly constrained (lowest-elasticity) path from head to tail may entail traversing some arcs in the graph "backward." The case considered above, where elements 1102, 1108, and 1110 are the least elastic elements in the grid 1100, furnishes one example of such a situation. Referring to FIG. 9, the calculation in this case can be visualized as a traversal of the grid fiducials in the order 1150, 1154, 1152, 1156, which corresponds to traversing the arc 1108 in the backward direction. Because this arc is traversed backward, the preferred width of element 1108 is subtracted rather than added to the total that becomes the preferred width of the grid.

The Elastic Difference Operation

Figure 10:
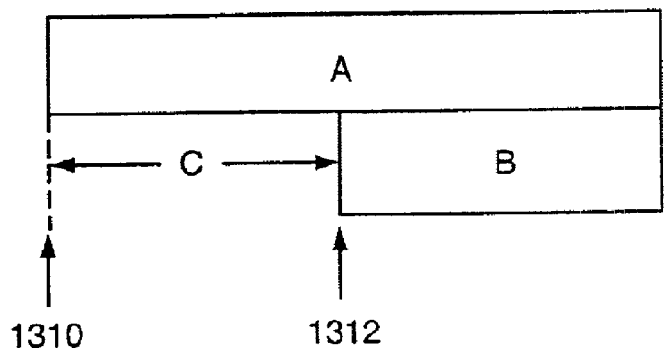
FIG. 10 is a diagram illustrating the Elastic difference operation according to one embodiment.

The above example illustrates that, when working with non-series-parallel fiducial graphs, the Elastic add and max operations are not enough. There is also a need for an Elastic "difference" or subtract operation, which is applied in situations such as those described above in which the size preference of element 1108 must be subtracted from the overall size preference of a grid. FIG. 10 is a diagram illustrating the Elastic difference operation according to one embodiment. The result of subtracting the Elastic B from the Elastic A may be visualized as the Elastic C as shown in FIG. 10.

The parameters of C should represent, as well as possible, the preferred size and elasticities that would be experienced during attempts to change the distance between the 1310 and 1312 in FIG. 10. Several principles governing the values of the Elastic parameters of C include:

The minimum size of C should be zero because it is always possible to deform C to zero size just by stretching B, which does not violate the minimum sizes of either A or B. (One could even imagine a minimum size that was less than zero, but the preferred embodiment is not designed to process Elastics whose sizes are negative.)

The preferred size of C should equal the preferred size of A minus the preferred size of B, except that (since Elastic sizes cannot be negative) if the preferred size of B is greater than that of A, the preferred size of C should be zero.

The compression properties of C are determined by the compression properties of A and the stretch properties of B, because in order to compress C, either A is compressed or B is stretched or both. If the compress order of A differs from the stretch order of B, then the compress order of C will equal whichever of those orders is greater; this corresponds to a situation in which compressing C is accomplished exclusively by compressing A or stretching B. If the compress order of A equals the stretch order of B, then compressing C will entail some compression of A and some stretching of B, in proportion to the compressibility coefficient of A and the stretchiness coefficient of B, respectively. In this case, C acts as though its compress order is equal to the compress order of A (and also the stretch order of B) and C's compressibility coefficient equals the sum of A's compressibility coefficient and B's stretchiness coefficient.

The stretch properties of C are likewise determined by the stretch properties of A and the compression properties of B.

According to one embodiment and following the above principles, the Elastic difference A–B is computed using an algorithm described as follows:

Algorithm 5

```
Fetch the parameters of A where
    amin is A's minimum size
    apref is A's preferred size
    acompress is A's compressibility coefficient
    aorderc is A's compress order
    astretch is A's stretchiness coefficient
    aorders is A's stretch order
let (amin:gdim, apref:gdim, acompress:float, aorderc:int, astretch:float,
aorders:int) = {A.unpack-as-elastic}
Fetch the parameters of B where
    bmin is B's minimum size
    bpref is B's preferred size
    bcompress is B's compressibility coefficient
    borderc is B's compress order
    bstretch is B's stretchiness coefficient
    borders is B's stretch order
let (bmin:gdim, bpref:gdim, bcompress:float, borderc:int, bstretch:float,
borders:int) = {B.unpack-as-elastic}
The parameters of the resulting Elastic C are computer in the
variables apref, acompress, aorderc, astretch, and aorders.
(The minimum size of the result Elastic C will always be zero
and requires no elaborate computation.)
The preferred size of the result equals A's preferred size minus B's
preferred size, except that the preffered size of the result cannot be
less than zero. Therefore, if B's preferred size exceeds A's preferred
size, set the preferred size of the result to zero.
```

-continued

```
set apref = apref - bpref
{if apref < 0 then set apref = 0}
{if aorderc < borders then
    If A's compress order is less than B's stretch order, then
    the compression properties of the result will equal
    the stretch properties of B:
    set acompress = bstretch
    set aorderc = borders
elseif aorderc == borders then
    If A's compress order equals B's stretch order, then the
    compressibility coefficient of the result will equal the
    sum of A's compressibility coefficient and B's
    stretchiness coefficient:
    set acompress = acompress + bstretch
    If A's compress order is greater than B's stretch order,
    then the compression properties of the result will
    equal the compression properties of A.
}
{if aorders < borderc then
    If A's stretch order is less than B's compress order, then
    the stretch properties of the result will equal
    the compression properties of B:
    set astretch = bcompress
    set aorders = borderc
elseif aorders == borderc then
    If A's stretch order equals B's compress order, then the
    stretchiness coefficient of the result will equal the
    sum of A's stretchiness coefficient and B's
    compressibility coefficient:
    set astretch = astretch + bcompress
    If A's stretch order is greater than B's compress order,
    then the stretch properties of the result will equal
    the stretch properties of A.
}
    The implementation of the Elastic system assumes that every Elastic's
    stretch properties are equally compliant or more compliant than that
    Elastic's compression properties. Check whether that condition holds
    for the parameters we have currently computed for the result of the
    Elastic difference operation. If the condition does not hold, increase
    the result's stretch properties so that they are at least as compliant as
    the compression properties that we have calculated:
{if aorders < aorderc then
    set aorders = aorderc
    set astretch = acompress
elseif aorders == aorderc and astretch < acompress the
    set astretch = acompress
}
    Finally assemble the result C from its components:
        C's minimum size equals 0
        C's preferred size equals apref
        C's compressibility coefficient equals acompress
        C's compress order equals aorderc
        C's stretchiness coefficient equals astretch
        C's stretch order equals aorders
set C = {pack-elastic
            minimum-size = 0,
            preferred-size = apref,
            compressibility = acompress,
            compress-order = aorderc,
            stretchiness = astretch,
            stretch-order = aorders,
}
```

Computing Size Preferences Using Non-Series-Parallel Fiducial Graphs

The algorithm for computing the size preference corresponding to a non-series-parallel fiducial graph operates on the partially reduced fiducial graph that results from applying Algorithm 1 to the original fiducial graph. The partially reduced fiducial graph has nodes that correspond to some of the fiducials in the original grid. The connections between nodes are represented by constraint objects. The constraint objects may all be Leaf constraints in the case of an irreducible fiducial graph such as that of FIG. 9, but the constraint objects could also be Parallel Composition or Series Composition constraints in the case of partially reducible fiducial graphs such as that of FIG. 5.

In brief overview, the algorithm computes the size preference for the distance from the fiducial corresponding to the head node (the "head fiducial") to each fiducial corresponding to a node in the partially reduced fiducial graph. One of the results of this computation is the desired size preference, which is just the size preference from the head node to the tail node of the partially reduced fiducial graph. The other size preferences are useful also, however, when setting the positions of the various fiducials.

According to one embodiment, Algorithm 6 associates an Elastic variable with each node in the partially reduced fiducial graph. When the algorithm terminates, this variable is intended to contain the size preference for the distance from the head fiducial to the fiducial corresponding to that node. As discussed below, this algorithm is not guaranteed to terminate and therefore needs to be adapted before being suitable for grid layout, but the ideas behind Algorithm 6 are the core ideas in the algorithm actually used.

Algorithm 6

Initialize each node's associated Elastic variable with a highly stretchy Elastic whose elasticity is greater than that of any grid element, except in the case of the head node of the graph, whose associated Elastic is initialized to a highly rigid Elastic of zero size (since the distance from any node to itself must be zero). This initialization step is followed by a repetition of the following:
1. Nondeterministically choose a node N and retrieve its associated Elastic value E.
2. Identify all constraints in the graph that have N as their head node.
3. For each such constraint C, retrieve C's associated Elastic EC and C's tail node T. Let ES be E+EC, the Elastic sum of E and EC. Let ET be the associated Elastic value of the node T. Let ENEW be max(ES,ET), the result of applying the Elastic max operation to ES and ET. If ENEW differs from ET, store ENEW as the new Elastic value associated with the node T.
4. Identify all constraints in the graph that have N as their tail node.
5. For each such constraint C, retrieve C's associated Elastic EC and C's head node H. Let ED be E−EC, the Elastic difference that results when EC is subtracted from E. Let EH be the associated Elastic value of the node H. Let ENEW be max(ED, EH), the result of applying the Elastic max operation to ED and EH. If ENEW differs from EH, store ENEW as the new Elastic value associated with the node H.
6. Return to step (1).

The algorithm terminates when, for any node N that could be chosen, the execution of steps (2) through (5) results in no change to the Elastic value associated with any other node.

Algorithm 6 effectively tries all traversal orders from the head node to each other node, computing an accumulated Elastic along each traversal path (using the Elastic add operation when traversing a constraint in the forward direction and using the Elastic difference operation when traversing a constraint in the reverse direction) and using the Elastic max operation to combine at each node the accumulated Elastic value for each traversal path that leads to that node. When (and if) the algorithm terminates, the Elastic associated with each node represents the size preference for the distance from the head fiducial to the fiducial associated with that node.

Figure 11:
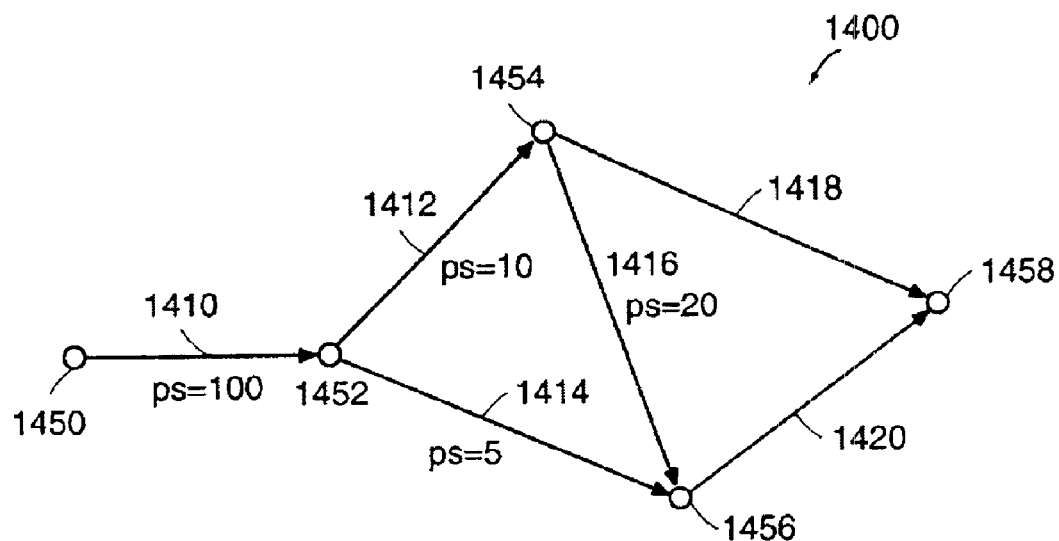
FIG. 11 is a partially reduced fiducial graph for which Algorithm 6 does not terminate.

Unfortunately, as mentioned above, there are many graphs for which this computation never terminates. FIG. 11 provides one such example. FIG. 11 is a partially reduced fiducial graph for which Algorithm 6 does not terminate. Let the Elastics associated with the constraints in this figure all have a minimum size of zero and have stretchiness and compressibility coefficients of 1.0. Let the Elastic associated with constraint 1410 have a preferred size of 100, the Elastic for constraint 1412 have a preferred size of 10, the Elastic for constraint 1414 have a preferred size of 5, and the Elastic for constraint 1416 have a preferred size of 20. These values have been noted in FIG. 11 by means of notations such as "ps=100". Let the Elastic for constraint 1410 have stretch and compress orders both equal to 40, while the stretch and compress orders of the Elastics for constraints 1412, 1414, and 1416 are all equal to zero. These stretch and compress orders are not noted in FIG. 11. The preferred sizes and elasticities of the remaining constraints 1418 and 1420 do not figure into this example.

If Algorithm 6 runs on the partially reduced fiducial graph 1400 of FIG. 11, the following sequence of events is possible. First, node 1450 is chosen as node N in step (1) and the Elastic associated with node 1452 is accordingly updated in step (3) to have a preferred size of 100 and stretch and compress orders of 40. Then node 1452 is chosen as node N in step (1) and the Elastic associated with node 1454 is updated in step (3) to have a preferred size of 110 and stretch and compress orders of 40. Then node 1454 is chosen as node N, which causes the Elastic associated with node 1456 to be updated in step (3) to have a preferred size of 130 and stretch and compress orders of 40. Then node 1456 is chosen as node N, causing the Elastic associated with node 1452 to be updated in step (5) to have a preferred size of 125 and stretch and compress orders of 40. It is possible to continue in a nonterminating sequence, cycling through choosing nodes 1452, 1454, and 1456 as node N in step (1), each time updating the Elastic value associated with the next node in the sequence. For each fill trip around the cycle, the preferred size of the Elastic associated with node 1452 (and in fact with each of the nodes 1452, 1454, and 1456) will increase by 25. Since it is always possible to choose a node N for which either step (3) or step (5) will change a node's Elastic value, the algorithm never terminates.

This problem occurs because the graph 1400 contains a cycle of nodes 1452, 1454, and 1456 which can be traversed by a combination of forward and backward traversals of constraints 1412, 1416, and 1414, such that the elasticities of the Elastics for these constraints are all equal and the sum of the preferred sizes for the constraints that are traversed forward exceeds the sum of the preferred sizes for the constraints that are traversed backward. Moreover, the elasticities of these Elastics are less than the elasticity of the Elastic for constraint 1410, which provides the pathway into this cycle. The result of this combination of circumstances is that the elasticities (e.g., the stretch and compress orders) of the Elastics for nodes 1452, 1454, and 1456 all come to have identical high values, at which point the Elastic max operation used in steps (3) and (5) of the algorithm simply reduces to performing a numerical maximum operation on preferred sizes. Since each trip around the loop results in a gain in preferred size, the process can continue indefinitely. The root cause of this phenomenon is that the Elastic add, subtract, and max operations each discard some information about their operands in order to be able to represent all Elastics using the same fixed number of parameters. In the case of Algorithm 6, the discarded information would be critical in detecting and preventing these kinds of nonterminating traversals through a cycle of nodes.

Figure 12:
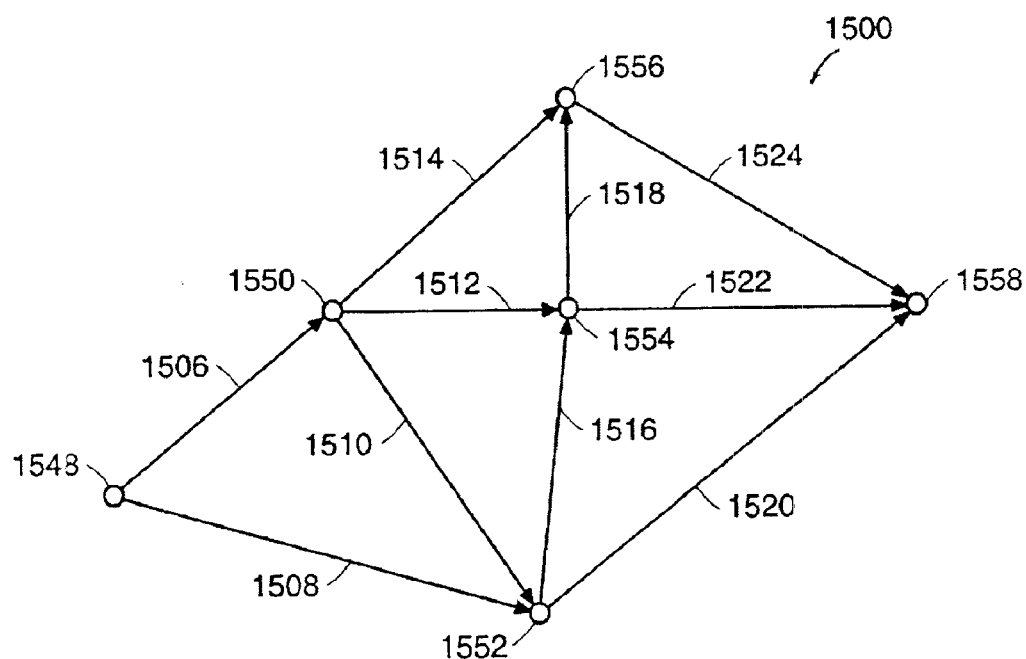
FIG. 12 is an example of a fiducial graph.

This sort of fiducial graph can occur fairly easily in practice. According to one embodiment, the nontermination problem is solved by introducing heuristics to limit and control the propagation and recomputation of Elastic values in the graph. The measures taken include the following:

A. Instead of choosing nodes nondeterministically, as in step (1) of Algorithm 6, nodes are explored in a systematic order beginning with the head node of the network. The exploration traces possible paths through the network such that whenever the Elastic value associated with a node is changed, (as in step (3) or (5) of Algorithm 6), the paths leading from the node whose Elastic value has been changed are traced in order to propagate the effects of the change to other nodes. However, whenever a node is processed, the processing occurs in the context of a particular path traced from the head node to the node being processed. Processing loops, such as those that can occur when Algorithm 6 is used on graph 1400, are avoided by preventing the computation from returning to reconsider any node that lies along this path. For example, if the processing of the graph 1500 of FIG. 12 begins with the head node 1548 and proceeds along the path to nodes 1550, 1552, and 1554, in that order, the computation will not return to consider node 1550 next. This is true even though it is reachable from node 1554 along constraint 1512, because node 1550 is already part of the path along which the computation has reached node 1554. However, traversal from node 1554 to node 1550 using the constraint 1512 will be enabled at other times during the computation, for example when node 1554 has been reached along a path consisting of nodes 1548, 1552, and 1554, in that order.

B. Special care is taken when propagating the results of traversing a constraint in the backward direction. In addition to the Elastic value stored at each node, a set of "back links" is stored at each node, representing the set of constraints whose backward traversals are deemed to have contributed to determining that node's Elastic value. For example, in graph 1500, if the Elastic value at node 1550 resulted from starting at the head node 1548 and traversing the constraints 1508, 1516, and 1512, in that order, the set of back links stored at node 1550 will contain the constraint 1512, since that constraint is traversed backward along the path just described. When an attempt is made to traverse a constraint backward from a node that already has that constraint in its set of back links, there is a risk of miscalculating the Elastic value for one or more nodes by a phenomenon analogous to the example illustrated above in connection with FIG. 11, where the preferred size of the Elastic for node 1452 was set successively to 100, 125, 150, etc., after multiple backward traversals of constraint 1414. Although the loop-avoidance technique described in point (A) above suffices to prevent such miscalculations in simple cases, miscalculations can still occur in more complex cases. Accordingly, if an attempt is detected to traverse a constraint backward from a node that already has that constraint in its set of back links, the constraint is added to a set of "disabled back links" that will not be traversed in the backward direction, and the entire computation is restarted. This heuristic technique may prevent the backward traversal of some constraints in situations where it is desirable, but it does effectively prevent any node's Elastic value from being computed based on a path that traverses any constraint more than once.

C. To reduce the frequency with which back links need to be disabled pursuant to point (B) above, the Elastic value associated with a constraint that is traversed in the backward direction is made more compliant before being used. This is accomplished by adding 1 to both the compress order and the stretch order of the Elastic value before using it. Tables such as the table of FIG. 2 yield partially reduced fiducial graphs in which the typical node is connected to several constraints, all of which have the same compress order and all of which have the same stretch order. In such cases, this adjustment reduces the effect on a node's Elastic value that results when the node is reached by traversing a constraint backward, reducing the likelihood of the constraint's being added to the set of disabled back links.

Another complication in the actual algorithms used for computing size preferences in non-series-parallel fiducial graphs stems from the fact that subsequent processing steps for assigning positions to fiducials are facilitated if certain items of information that can easily be collected while computing size preferences are stored and retained for use during those subsequent processing steps. In particular, those subsequent steps rely on knowing, for each fiducial F, not just the size preference from the head fiducial to F, but also the size preference from F to the tail fiducial. It is therefore desirable to generalize the algorithm for computing size preferences so that it can work either forward from the head fiducial or backward from the tail fiducial. When tracing back from the tail fiducial, the concepts described above regarding the direction of traversal of constraints must be reversed. For example, when tracing back from the tail fiducial, a "back link" corresponds to the traversal of a constraint from the constraint's head toward the constraint's tail. Algorithms 7 through 10, described below, describe only the computation of size preferences from the head fiducial to each other fiducial. The alterations to these algorithms that are needed for computing size preferences back from the tail fiducial are described after the presentation of Algorithm 10.

Beyond the information about size preferences, it is also desirable to preserve information about the chains of constraints in the partially reduced fiducial graph that most tightly constrain the size preference between the head fiducial and each other fiducial. According to one embodiment, the algorithms presented below preserve this information in a "prev" field associated with each fiducial.

Finally, subsequent processing steps will need to apply the algorithms described here in some cases where positions have already been assigned to some fiducials. Accordingly, provisions are added to handle this situation.

The resulting algorithms represent a partially reduced fiducial graph as a NetworkGridConstraint object that includes the following fields:

"components" is a set of constraint objects, containing all the constraint objects that connect nodes in the partially reduced fiducial graph. For example, in the graph 1500 of FIG. 12, this set would contain all the constraints 1506 through 1524.

"head" is the fiducial object that corresponds to the head node of the partially reduced fiducial graph. For example, in graph 1500 the value of this field would be the fiducial object associated with node 1548.

"tail" is the fiducial object that corresponds to the tail node of the partially reduced fiducial graph. For example, in graph 1500 the value of this field would be the fiducial object associated with node 1558.

"disabled-back-links" holds a set of disabled back links, as described above.

"nodemap" is a hash table that maps fiducial objects (each of which corresponds to a node in the partially reduced fiducial graph) to NetworkGridNode objects, which are used to store various items of information about the fiducials.

One NetworkGridNode object is created for each node in the partially reduced fiducial graph. Each NetworkGridNode object includes the following fields containing information about its associated fiducial object:

"successors" is a set of the constraint objects that have this fiducial object as their head fiducial. For example, for the node 1554 in FIG. 12, this set would contain the constraints 1518 and 1522.

"predecessors" is a set of the constraint objects that have this fiducial object as their tail fiducial. For example, for the node 1554 in FIG. 12, this set would contain the constraints 1512 and 1516.

"fiducial" is a pointer to the fiducial object that corresponds to this NetworkGridNode.

"elastic-from-head" is an Elastic object that describes a size preference between the head fiducial of the partially reduced fiducial graph and the fiducial object that corresponds to this NetworkGridNode.

"elastic-to-tail" is an Elastic object that describes a size preference between the fiducial object that corresponds to this NetworkGridNode and the tail fiducial of the partially reduced fiducial graph.

"back-links" is a set of constraint objects whose traversal in a backward direction affected the current value of this NetworkGridNode's elastic-from-head or elastic-from-tail field, depending on which of these fields is currently being computed.

"marked" is a Boolean that is set while a node is being processed, to avoid loops that come back and revisit that node while it is still being processed.

"prev" will be the last NetworkGridNode from which a constraint was traversed that affected (i.e., changed) this node's elastic-from-head value. The information in this field is used when assigning positions to fiducials, as described below in Algorithms 11 and 12.

The overall computation is performed by a method NetworkGridConstraint.get-elastic (described by the pseudocode in Algorithm 7) that uses helper methods NetworkGridConstraint.propagate-stretch (described in Algorithm 8) and NetworkGridConstraint.propagate-stretch-recur (described in Algorithm 9). For simplicity, only the forward versions of the latter two methods, which compute the size preference from the head fiducial to each fiducial, are presented in detail. The reverse versions are described separately later.

Algorithm 7

According to one embodiment, the definition of {ngc.get-elastic}, where ngc is a NetworkGridConstraint includes the following:

1. For each constraint c in ngc.components, ask c to compute its associated Elastic.
2. Remove all elements from ngc.disabled-back-links.
3. Call {ngc.propagate-stretch ngc.head}.
4. Let nt be ngc.nodemap[ngc.tail]; nt is thus the NetworkGridNode associated with the tail fiducial of ngc.
5. Return nt.elastic-from-head.

The computation of a size preference for a partially reduced fiducial graph is orchestrated by the NetworkGridConstraint.get-elastic method described in Algorithm 7. In step (1) of Algorithm 7, this method computes the Elastic value that represents the size preference of each constraint in the partially reduced fiducial graph. These Elastic values serve as the basis for computing the size preference of the NetworkGridConstraint itself. In step (2), the NetworkGridConstraint's set of disabled back links is emptied, setting up the initial conditions for applying Algorithms 8 and 9.

In step (3), the NetworkGridConstraint.propagate-stretch method is called. As described below, this method call causes the elastic-from-head field of each NetworkGridNode in the partially reduced fiducial graph to be set to an Elastic value that represents the size preference from the graph's head fiducial to the fiducial associated with that NetworkGridNode.

In step (4) the variable nt is set to the NetworkGridNode associated with the tail fiducial of the partially reduced fiducial graph. The elastic-from-head field of nt thus contains an Elastic value representing the size preference from the graph's head fiducial to the graph's tail fiducial, which is the overall size preference of the graph. This Elastic value is accordingly returned in step (5) as the value of the graph's size preference.

Algorithm 8

According to one embodiment, the definition of {ngc.propagate-stretch f}, where ngc is a NetworkGridConstraint and f is a fiducial includes the following:

1. For each NetworkGridNode n in ngc.nodemap,
   a. Set n.elastic-from-head to a highly stretchy Elastic, whose elasticity is greater than that of any element in the grid and whose minimum and preferred sizes are zero.
   b. Set n.back-links to an empty set and set n.marked to false.
2. Let u be a highly rigid Elastic of size zero.
   Let b1 be an empty set.
3. Let c be the result of calling {ngc.propagate-stretch-recur f, null, u, b1}.
4. If c is null, then return. If c is not null, then add c to ngc.disabled-back-links and go back to step (1).

The NetworkGridConstraint.propagate-stretch method described in Algorithm 8 contains the outermost loop that controls the size preference calculation. This loop starts with an empty set of disabled back links. A new iteration of the loop begins every time a back link is added to this disabled set; for each such new loop iteration, the process of computing the elastic-from-head values of the individual NetworkGridNodes must start over from the beginning.

The algorithm begins with the variable f containing the fiducial from which size preferences are being computed. In one embodiment, f is the head fiducial of the graph. For example, in graph 1500 of FIG. 12, f will be node 1548.

In step (1) of Algorithm 8, certain fields are initialized in each NetworkGridNode in the partially reduced fiducial graph. Each node's elastic-from-head field is initialized in step (1a) to an Elastic that is more compliant than any constraint in the partially reduced fiducial graph. Any path to this node that is subsequently traced will result in replacing this Elastic value with a less compliant value. In step (1b) the set of back links associated with each node is initialized to an empty set and each node's marked field is set to false. A node's marked field will be true whenever it is part of a path that is in the process of being traced.

In step (2) of Algorithm 8, the variable u is set to a highly rigid Elastic of size zero, which will become the elastic-from-head of the head node of the network. The variable b1 is initialized to an empty set which will be used as the initial set of back links for tracing paths through the graph.

In step (3) the NetworkGridConstraint.propagate-stretch-recur method (described in Algorithm 9) is called. This method will recursively trace all paths through the fiducial graph as far as needed to ensure that all the graph's constraints have been taken into account in computing the elastic-from-head values of all the nodes in the graph. This method returns null to indicate a successful computation. If the computation encounters a constraint that should be added to the set of disabled back links, then this method returns that constraint as its value.

Accordingly, in step (4) the return value from the method call of step (3) is checked. If it is null, the computation was successful and the call to NetworkGridConstraint.propagate-stretch returns. If the return value in step (3) is not null, then this return value is a constraint that is added to the set of disabled back links, after which control returns to step (1) of Algorithm 8, which will retry the entire computation with this additional member in the set of disabled back links.

Algorithm 9

According to one embodiment, the definition of {ngc.propagate-stretch-recur f, prev, e, back-links} where ngc is a NetworkGridConstraint, f is a fiducial, prev is a NetworkGridNode, e is an Elastic, and back-links is a set of constraints includes the following:

1. Let n be ngc.nodemap[f], so n is the NetworkGridNode corresponding to f.
2. If n.marked is true, then return null.
3. Let ne be n.elastic-from-head.
4. Check whether a position has already been assigned to the fiducial f. If not, let ee be max(e,ne); in other words, ee is the result of applying the Elastic max operation to e and ne. If a position has already been assigned to f, then perform the following:
   a. Let fpos be the position that has been assigned to f and let hpos be the position that has been assigned to the fiducial ngc.head. Let offset be fpos-hpos.
   b. Let ee be a highly rigid Elastic whose preferred and minimum sizes are both equal to offset.
   c. Set back-links to an empty set.
5. If ee is equal to ne, then return null.
6. Compare ee with e. If they are unequal, then set back-links to the set union of back-links and n.back-links. If ee and e are equal, then if ee and ne are equal except for their minimum sizes, set back-links to n.back-links.
7. Set n.back-links to back-links, set n.elastic-from-head to ee, and set n.prev to prev.
8. Set n.marked to true.
9. Sort the constraints in n.successors so that their associated Elastics are arranged in order of increasing elasticity such that the most rigid Elastics come first. Algorithm 10, below, describes the sorting criterion according to one embodiment in more detail. Loop through this sequence in order, and for each constraint c in the sequence, perform the following:
   a. Let ce be the Elastic associated with the constraint c. Let ct be the tail fiducial of c. Let newe be ee+ce; in other words, newe is the Elastic sum of ee and ce.
   b. Let pc be the result returned by calling {ngc.propagate-stretch-recur ct, n, newe, back-links}.
   c. If pc is non-null then return pc immediately as the value of the call to {ngc.propagate-stretch-recur f, prev, e, back-links}.
10. Sort the constraints in n.predecessors so that their associated Elastics are arranged in order of increasing elasticity (i.e., so that the most rigid Elastics come first, as described in Algorithm 10, below). Loop through this sequence in order, and for each constraint c in the sequence, perform the following:
    a. Check whether c is a member of ngc.disabled-back-links. If so, skip the remaining processing of this constraint c.
    b. Check whether c is a member of back-links. If so, return c immediately as the value of the call to {ngc.propagate-stretch-recur f, prev, e, back-links}.
    c. Let ce be the Elastic associated with the constraint c. Let ch be the head fiducial of c.
       Let cce be an Elastic equal to ce except that the stretch and compress orders of cce are each greater by 1 than the corresponding parameters of ce.
       Let newe be ee−cce, the Elastic difference of ee and cce.
       Let nbl be the set that results from adding the constraint c to the set back-links.
    d. Let pc be the result returned by calling {ngc.propagate-stretch-recur ch, n, newe, nbl}.
    e. If pc is non-null then return pc immediately as the value of the call to {ngc.propagate-stretch-recur f, prev, e, back-links}.
11. Set n.marked to false.
12. Return null.

The workhorse method of this computation is the NetworkGridConstraint.propagate-stretch-recur method described in Algorithm 9. This method is called with four arguments:

"f" is the fiducial to be traced by this call. If the processing of this call results in tracing further fiducials that are reachable from f by traversing a constraint, the tracing of each further fiducial is accomplished by a recursive call to this method giving the further fiducial as an argument.

"prev" is the previous fiducial along the path by which the currently active chain of method calls has reached f. In the initial call to this method, f is the head fiducial of the graph and prev is null. In recursive calls, f is the fiducial to be traced and prev is the fiducial from which f was reached by traversing a constraint.

"e" is an Elastic value that represents the accumulated size preference from the head fiducial to f when f is reached via a path that passes through the constraint linking prev to f. When f is the head fiducial of the graph, then e is just a highly rigid Elastic of zero size.

"back-links" is a set of constraints whose backward traversal has contributed to the value that is passed in the argument e.

The initial call to this method comes from step (3) of Algorithm 8. In this call, f is the head fiducial of the partially reduced fiducial graph. For example, in graph 1500 of FIG. 12, the value of f in this initial call would be fiducial 1548. The value of prev in this initial call is null and e is a highly rigid Elastic of size zero, representing the size preference along the (null) path from the head fiducial 1548 to itself. Finally, the value of back-links in this initial call will be an empty set.

In the course of exploring the graph, the propagate-stretch-recur method will make recursive calls to itself (in steps (9b) and (10d)) to explore constraints that lead forward or backward from the fiducial f. For example, the initial call described in the previous paragraph will make a recursive call (in step (9b)) corresponding to a forward traversal of constraint 1508. In this call, the first argument will be fiducial 1552, the tail fiducial of constraint 1508. The second argument will be node 1548, the node from which the recursive call is made. The third argument will equal the Elastic sum of a highly rigid Elastic of size zero and the Elastic value associated with constraint 1508. This Elastic sum is just equal to the Elastic value associated with constraint 1508. Finally, the fourth argument is an empty set because no backward constraint traversals contributed to calculating the value of the third argument.

From the recursive call described in the previous paragraph, a further recursive call will eventually be made (in step (10d)) corresponding to a backward traversal of constraint 1510. In this call, the first argument will be fiducial 1550, the head fiducial of constraint 1510. The second argument will be node 1552, the node from which the recursive call is made. The third argument will be the Elastic difference of the elastic-from-head value of node 1552 and the Elastic value associated with constraint 1510. The fourth argument would be a set containing the constraint 1510, since the backward traversal of that constraint contributes to the Elastic value passed as the third argument.

If the propagate-stretch-recur method returns a non-null value, then this returned value is a constraint that must be added to the set of disabled back links, after which the entire propagate-stretch computation, beginning with step (1) of Algorithm 8, must run again. If the method of Algorithm 9 returns a null value, then all nodes in the partially reduced fiducial graph that are reachable from f and are not on the path leading to the current propagate-stretch-recur call will have been traced, and all paths through those nodes that could contribute to the elastic-from-head value of any of those nodes will have been traversed (subject to the constraint that no disabled back links be used).

In step (1) of Algorithm 9, the variable n is set to the NetworkGridNode that corresponds to f, the fiducial that is to be traced by this method call. Step (2) checks whether this node is currently marked. If so, the node lies along the path that is currently being traced and hence should not be visited again; accordingly, the method call returns immediately in this case. If a node is not marked and execution proceeds beyond this step, the "marked" field of the node will eventually be set to true in step (8), before any recursive calls are made, and then will be set back to false in step (11), after all recursive calls have been made. The node thus is marked for the duration of the recursive calls. Accordingly, at the time of the second recursive call in the set of examples given above, the nodes 1548 and 1552 will be marked because they are along the path to node 1550, the node that is to be traced by the second recursive call. But if this call makes a third recursive call to trace node 1548 (corresponding to a backward traversal of constraint 1506), the third recursive call will return in step (2) because the node 1548 is already marked.

If the node n is not currently marked, then execution proceeds to step (3), where the variable ne is set to the current elastic-from-head value of the node n that this method call is tracing. This value will initially be the highly stretchy Elastic value set during step (1a) of Algorithm 8, but if this node has already been visited by a propagate-stretch-recur call that arrived via a different path, the elastic-from-head field may already contain an Elastic value that differs from the original, highly stretchy value.

The overall goal of step (4) of Algorithm 9 is to combine the information in the variable ne, which contains the node's current elastic-from-head value, with the information in the variable e, which contains an Elastic value resulting from traversing a path through the partially reduced fiducial graph that may not have been traversed before. The processing in this step depends on whether a position has already been assigned to the fiducial f. When the call to this method originates in NetworkGridConstraint.get-elastic (Algorithm 7), a position will not yet have been assigned to any fiducial. However, subsequent processing stages, such as those described in Algorithms 11 and 12 below, invoke the processing of Algorithm 9 with positions already assigned to some fiducials.

When a position has not yet been assigned to the fiducial f, step (4) simply sets the variable ee to the result of applying the Elastic max operation to e and ne. This result ee should become the new elastic-from-head associated with this node. It is computed using the Elastic max operation for exactly the same reasons as this operation is used in steps (3) and (5) of Algorithm 6.

If a position has already been assigned to the fiducial f, then the appropriate value for the elastic-from-head field of this node is a highly rigid Elastic value whose minimum and preferred sizes are equal to the distance between the assigned position of the head fiducial and the assigned position of f. The values of e and ne are not relevant to this computation because there are no circumstances under which the position already assigned to f can be changed, no matter what Elastic values are associated with any constraints in the fiducial graph. Therefore, the operations in step (4a) of Algorithm 9 compute in the variable "offset" the distance between the position of the head fiducial and that of f and step (4b) sets the variable ee to a highly rigid Elastic value whose minimum and preferred sizes are equal to "offset". Finally, since the information coming from e was not used in computing this Elastic value ee, the set of back links associated with e did not contribute to the computation of ee. Accordingly, in step (4c) the value of the variable back-links is set to an empty set, reflecting the fact that no back links were traversed in order to arrive at the Elastic value in ee.

No matter which path is taken through step (4) of Algorithm 9, execution then continues at step (5). In this step, the variable ee, which contains the newly computed Elastic value that should be the elastic-from-head value of the current node n, is compared with ne, which is the current elastic-from-head value of n. If these values differ, then the value ee will eventually be stored as n's elastic-from-head value and it will then be necessary to trace nodes that are reachable from n so that the effects of this change in n's elastic-from-head value can be propagated to other nodes that might be affected. However, if ee and ne are equal, then the traversal path leading to the current method call has no effect on n's elastic-from-head value, and hence there is no effect to propagate to any other node. Accordingly, if ee and ne are equal, step (5) simply returns from the current method call, leaving the fields of the current node n unchanged.

If execution reaches step (6), then the elastic-from-head value of the current node n needs to be updated, and the back-links and prev fields may need to be updated as well. Step (6) analyzes the result ee to determine whether it is equal to e or is equal to neither e nor ne. In the latter case (when the Elastic max of e and ne is equal to neither e nor ne), both e and ne have made contributions to the resulting value. One example of a situation in which this could occur is when e and ne have the same preferred size, e is more compressible than ne, and ne is more stretchy than e. The Elastic max of these two values would have the same preferred size as the operands, but would have the compression properties of ne and the stretch properties of e; in other words, in each size range the result takes on the properties of the less compliant of the two operands. In this case, the set of back links that have made contributions to the value ee is the union of the set of back links that contributed to e (found in the current value of the back-links variable) and the set of back links that contributed to ne (found in the current value of the back-links field of n). Accordingly, step (6) sets the value of the back-links variable to that set union.

If ee and e are equal, then the entire influence on the value to be stored in the current node n's elastic-from-head field comes from the Elastic value e derived from the current traversal path. Accordingly, when this value is stored into the elastic-from-head field of n, the set of back links pertinent to e should be stored into the back-links field of n. This set is just the set that is currently the value of the back-links variable.

Step (6) does make one exception to this rule, however. If ee and ne are equal except for their minimum sizes, then the only change in n's elastic-from-head value that will occur when ee is stored there is that the minimum size will change. Moreover, since the minimum size of the result of an Elastic max operation equals the greater of the minimum sizes of the operands, if ee's minimum size differs from ne's, then ee's minimum size must be greater than ne's and the result of updating n's elastic-from-head field will be to increase the minimum size of the Elastic value in this field. The traversal of back links can never increase a node's minimum size because the Elastic subtract operation is used when traversing back links and the minimum size is always zero in the result of the Elastic subtract operation. Therefore, if the result of this method call is only to increase the minimum size of the node n's elastic-from-head value, it is acceptable to consider that only those back links that contributed to the previous value of n's elastic-from-head field have contributed to the new value of this field. Thus, in this one case, it is acceptable to ignore the value of the back links that are deemed to have contributed to the Elastic value e. Accordingly, in this case the back-links field of n is copied into the back-links variable, so that it can be stored back into the back-links field of n in step (7). In an alternative embodiment, this adjustment may be applied successfully at an earlier point in step (6) than the point described here. In still another embodiment, this adjustment may benefit from comparing the values of the back-links variable and the n.back-links field and using whichever set is smaller as the set of back links to store back into the n.back-links field.

When step (7) of Algorithm 9 is reached, the variables back-links, ee, and prev contain the values to be stored into the back-links, elastic-from-head, and prev fields, respectively, of the current node n. Step (7) simply stores these values into the respective fields so that they will be available during subsequent traversals that visit this node.

When execution reaches step (8), the fields of the current node n have been updated in response to the information passed as arguments to this method call, and it is time to propagate the results of these updates to other nodes that are reachable from n. This propagation occurs by means of recursive calls to propagate-stretch-recur with suitable arguments. Before making these calls, however, n must be marked so that the processing during these recursive calls will not loop back and attempt to update n itself. To satisfy this goal, step (8) sets the "marked" field of n to true. This field will be reset to false in step (11) after all recursive calls have been made.

The recursive calls themselves are grouped into those that involve forward traversal of constraints and those that involve backward traversal of constraints. The forward calls are made in step (9) and the backward calls are made in step (10). The "successors" field of the current node n contains a set of constraints that can be traversed forward from n (i.e., the set of constraints that have n's associated fiducial as their head fiducial). In step (9) the successors of n are sorted so that their associated Elastic values are arranged in order of increasing elasticity using Algorithm 10 to determine which of two Elastic values has greater elasticity. The goal of this sort is to improve the efficiency of the computation by first following the paths that will most rigidly constrain the size preferences of other fiducials. Following paths in this order increases the likelihood of computing nodes' eventual elastic-from-head values early, so that most attempts to trace a node will not change the node's elastic-from-head value and consequently will terminate at step (5) of Algorithm 9 without requiring the tracing of additional nodes. Several methods of comparing the elasticity of two Elastics would probably be suitable for the purposes of this sort; Algorithm 10 describes one way to perform the comparison that has been implemented and found suitable for this purpose.

After the constraints are sorted in step (9) of Algorithm 9, steps (9a) through (9c) are executed for each constraint c. Step (9a) computes in the variable newe the Elastic value that represents the accumulated size preference along the path that goes through the fiducial f and follows the constraint c forward to ct, the tail fiducial of c. As in step (3) of Algorithm 6, this accumulated size preference is computed by applying the Elastic add operation to ee (the current size preference to f from the head of the partially reduced fiducial graph) and ce (the Elastic value that represents the size preference of the constraint c).

Step (9b) then makes a recursive call to update the size preference associated with the fiducial ct based on this information. Accordingly, newe is passed as the Elastic value to the recursive call. Since this recursive call is associated with a forward traversal of a constraint, no new back links are added to the set stored in the back-links variable. Finally, the current node n is passed as the "prev" argument that indicates the node from which the recursive call is propagating this information.

In step (9c), the result returned by the recursive call in step (9b) is checked. If the result is null, then the computation stemming from the recursive call occurred without a problem and the execution of this method can continue, looping back to process any further constraints that should be processed in steps (9a) through (9c). If the result is not null, then the computation stemming from the recursive call resulted in the identification of a constraint "pc" that should be added to the set of disabled back links. In this case, execution of this method must be aborted and the constraint "pc" must be passed back to this method's caller. This return will set in motion a chain of similar returns from calls to propagate-stretch-recur, finally causing a return to the call in step (3) of Algorithm 8. At that point, the non-null return value will be detected, causing the constraint "pc" to be added to the set of disabled back links, after which the computation of all nodes' elastic-from-head values will be attempted again in its entirety.

When there are no further constraints to process in step (9) of Algorithm 9, execution proceeds to step (10), which handles the backward traversal of constraints from the current node n. The processing in step (10) is quite similar to that in step (9), but there are some differences owing to the special treatment that is accorded to back links. The "predecessors" field of the node n contains a set of constraints that can be traversed backward from n (i.e., the set of constraints that have n's associated fiducial as their tail fiducial). In step (10) the predecessors of n are first sorted so that their associated Elastic values are arranged in order of increasing elasticity. The procedure for doing this and the reasons for doing it are both just as in step (9).

After the constraints are sorted in step (10), each constraint c is processed in a sequence of steps beginning with step (10a). Step (10a) checks whether c is a member of the set of disabled back links. If this is the case, backward traversal of c should not be attempted and c is not processed any further. Instead, the loop in step (10) continues on to process any remaining unprocessed constraints.

If c is not in the set of disabled back links, then step (10b) checks whether c is a member of the set stored in the variable back-links. If so, then c has already contributed to the value of the current node's elastic-from-head field and should not be traversed backward again. In this situation, the policy described earlier for managing the set of disabled back links requires that c be added to the disabled set. Accordingly, if c is in the set stored in the variable back-links, this method call immediately returns c as its value, indicating that the computation has failed and should be retried after adding c to the set of disabled back links. As written, the logic in this step implements a relatively aggressive policy for adding to the set of disabled back links. Other strategies are possible. For example, in an alternative embodiment a constraint could be added to the set of disabled back links only when it is detected in this step and the head node of the constraint is not already marked. With a more substantial reorganization of this algorithm, addition of a constraint to the set of disabled back links could even be deferred until backward traversal of the constraint for the second time is found in step (5) of a recursive call of Algorithm 9 to actually result in a change to the elastic-from-head value of some node.

If the check in step (10b) of Algorithm 9 does not indicate a problem, execution proceeds to step (10c). Step (10c) is analogous to step (9a) in that it computes values to be passed as arguments to a recursive propagate-stretch-recur call. The variable newe is computed as the Elastic value representing the accumulated size preference along the path that goes through the fiducial f and follows the constraint c backward to ch, the head fiducial of c. As in step (5) of Algorithm 6, this accumulated size preference is computed by applying the Elastic subtract operation. However, the Elastic value ce that is associated with the constraint c is first adjusted by increasing its stretch and compress orders by 1 for the reasons discussed following the presentation of Algorithm 6. The variable cce is set to the result of this adjustment, and newe becomes the Elastic difference of ee (the current size preference to f from the head of the partially reduced fiducial graph) and cce. Step (10c) of Algorithm 9 also computes in the variable nbl the set of back links to be passed to the recursive propagate-stretch-recur call. This set includes the constraint c (which is about to be traversed backward) in addition to the set of back links (which can be found in the variable back-links) that contributed to the elastic-from-head value of the current node n.

Step (10d) is much like step (9b) in that it makes a recursive propagate-stretch-recur call. The argument ch indicates the fiducial that should be traced (which is the head fiducial of the constraint c); the argument n indicates the node from which this recursive call is made; the argument newe represents the accumulated size preference along the path being traced; and nbl indicates the set of back links that contributed to that size preference.

Step (10e), like step (9c), checks the value returned from the recursive call. As in step (9c), a return value of null means that processing can continue, while any other return value causes further processing to be aborted and is immediately returned as the return value of the current method call.

When all predecessors of the current node n have been considered in step (10), execution proceeds to step (11). When execution reaches this point, all recursive calls have been made and the tracing of the current node n is complete. Accordingly, the "marked" field of n is reset to false and in step (12), the method call returns a null value, indicating successful completion of the tracing of n and of all the recursive processing engendered by that tracing.

Algorithm 10

According to one embodiment, this algorithm describes the sorting criterion used in steps (9) and (10) of Algorithm 9. The description is stated as a procedure for comparing two Elastics A and B and returning a Boolean value that is true if B is considered to have a greater elasticity than A and is false if B is considered not to have a greater elasticity than A.

1. Let E be max(A,B), the result of applying the Elastic max operation to A and B.
2. If E is equal to A, then return true.
3. If E is equal to B, then return false.
4. If A's stretch order is less than B's, return true.
   If A's stretch order is greater than B's, return false.
5. If A's compress order is less than B's, return true.
   If A's compress order is greater than B's, return false.
6. If A's stretchiness coefficient is less than B's, return true.
   If A's stretchiness coefficient is greater than B's, return false.
7. If A's compressibility coefficient is less than B's, return true.
   If A's compressibility coefficient is greater than B's, return false.
8. If A's minimum size is greater than B's, return true.
   If A's minimum size is less than B's, return false.
9. If A's preferred size is greater than B's, return true.
   If A's preferred size is less than B's, return false.
10. Otherwise, return true.

The goal of Algorithm 10 is to determine whether an Elastic value B should be considered to be more compliant than another Elastic value A. Steps (1) through (3) of this algorithm are based on using the Elastic max operation to compare the elasticity of two Elastic values. In general, if applying the Elastic max operation to two values, A and B, yields a result equal to A, then B may be considered to be more compliant than A. This is because the result indicates that if A and B are connected in parallel, the Elastic B will play a completely subordinate role and the properties of the ensemble will be determined entirely by the properties of the Elastic A. Accordingly, Algorithm 10 begins in step (1) by computing E as the Elastic max of the operands A and B. In step (2), if E is found to equal A, then B is considered more compliant than A and hence true is returned. In step (3), conversely, if E is found to equal B, then A is considered more compliant than B and hence false is returned.

If E is equal to neither A nor B, then a succession of tie-breaking rules are applied to select one or the other of A and B as the Elastic to be sorted earlier in steps (9) and (10) of Algorithm 9. Although a set of rules according to one embodiment are presented, one skilled in the art may alter them accordingly. In step (4), if the stretch orders of A and B are found to differ, then the Elastic with the greater stretch order is considered to be the more compliant Elastic. If the stretch orders of A and B are equal, then in step (5) the compress orders of A and B are likewise compared, and if they differ, the Elastic with the greater compress order is considered to be the more compliant Elastic.

If no difference between A and B is discovered in step (4) or (5), then the comparison of parameters of A and B continues by comparing their stretchiness coefficients and compressibility coefficients in steps (6) and (7). If a difference is found, the Elastic with the larger coefficient is considered to be the more compliant Elastic. If no difference is found before execution reaches step (8), then as a final set of tie-breaking measures, an Elastic is considered to be less compliant in step (8) if its minimum size is greater, and is considered to be less compliant in step (9) if its preferred size is greater. Step (10) should never be reached, since if all parameters of two Elastic values A and B are equal, then A and B themselves are equal. In this case, the value max(A,B) computed in step (1) should also be equal to both A and B, and the comparison in step (2) would already have returned true. However, step (10) is included as a final safety measure.

As mentioned above, reverse versions also exist for the propagate-stretch and propagate-stretch-recur methods (Algorithms 8 and 9, above). These reverse versions will be termed reverse-propagate-stretch and reverse-propagate-stretch-recur. They differ from the correspondingly named forward versions as follows:

All references to propagate-stretch are replaced with references to reverse-propagate-stretch and all references to propagate-stretch-recur are replaced with references to reverse-propagate-stretch-recur.

All references to the successors field of NetworkGridNode objects are replaced with references to the predecessors field, and likewise all references to the predecessors field are replaced with references to the successors field.

All references to head fiducials are replaced with references to tail fiducials, and likewise all references to tail fiducials are replaced with references to head fiducials.

All references to the elastic-from-head field of NetworkGridNode objects are replaced with references to the elastic-to-tail field.

Step (4b) of the propagate-stretch-recur method (Algorithm 9) reads as
  b. Let fpos be the position that has been assigned to f and let hpos be the position that has been assigned to the fiducial ngc.head. Let offset be fpos–hpos.

The corresponding step of the reverse-propagate-stretch-recur method reads as
  b. Let fpos be the position that has been assigned to f and let tpos be the position that has been assigned to the fiducial ngc.tail. Let offset be tpos–fpos.

The prev field of NetworkGridNode objects is not used. In other words, the set operation to n.prev in step (7) of Algorithm 9 is not performed.

Allocating Space Using Non-Series-Parallel Fiducial Graphs

When the actual size allocated to a grid dimension has been determined, the positions of all the fiducials in that dimension, and the consequent sizes in that dimension of the grid elements, must be computed. In the case of a fiducial graph that is not series-parallel, Algorithm 4 cannot be used directly. When the size allocated to a grid dimension equals the preferred size of that grid dimension, calculating the position of each fiducial should be a simple matter: just assign each fiducial a position that corresponds to the preferred size of the elastic-from-head computed for that fiducial by Algorithm 9. However, it is necessary to have an algorithm that can address the situation in which the size allocated to a grid dimension differs from its preferred size. This problem is particularly challenging when the allocated size of the grid dimension is less than its preferred size; in this case, it is important to choose an algorithm that avoids "painting itself into a corner" by allocating space too generously at first, leaving insufficient space even to meet the minimum size requirements of some grid elements that are considered later in the process.

According to one embodiment, the highest priority goal for the algorithm is to assign positions to fiducials in a way that respects the left-to-right or top-to-bottom order of fiducials in the grid: if there is a constraint whose head fiducial is H and whose tail fiducial is T, T should never be assigned a position that is less than the position assigned to H. Such an assignment would imply a negative size for one or more grid elements, which is unacceptable. For example, in the fiducial graph of FIG. 9, the fiducial 1152 should always be before the fiducial 1154 because the constraint 1108 has fiducial 1152 as its head and fiducial 1154 as its tail. Therefore, the position assigned to fiducial 1154 should never be less than the position assigned to fiducial 1152.

A secondary, but still very important, goal is to assign positions to fiducials in a way that avoids violating the minimum size of any grid element. A tertiary, but still important, goal is to assign positions to fiducials in a way that reflects as well as possible the preferred sizes and elasticities of the various grid elements, as expressed by the Elastic objects associated with the constraints in the partially reduced fiducial graph. The algorithms described below address these goals by taking the following measures:

Recompute the elastic-from-head and elastic-to-tail of each NetworkGridNode after setting the positions of the head and tail fiducials of the partially reduced fiducial graph to values that reflect the overall space that has been allocated for the grid.

Work through the NetworkGridNode objects, assigning fiducial positions in an order carefully chosen to minimize the risk of violating any grid element's minimum size. As each fiducial's position is assigned, this assigned position immediately becomes an additional input in computing the positions to assign to the remaining fiducials. The elastic-from-head and elastic-to-tail values associated with each fiducial are used as additional inputs to this assignment process, providing a summarized view of the preferences for the position of each fiducial that arise from the various connections in the partially reduced fiducial graph.

According to one embodiment, the "prev" field of NetworkGridNode contains information that is helpful in choosing the order in which to consider fiducials. The prev field of a node N is either null or points to one of the nodes X from which a constraint was traversed that caused N's elastic-from-head to become more tightly constrained. The chain of prev pointers leading from a node N defines, in reverse order, a chain of nodes leading to N. This latter chain can be identified by following N's prev field back to another node, and then in turn following that node's prev field back to another node, and so on until the head node of the network is reached. (The head node is the only one whose prev field should contain null.) The nodes along this chain leading to a node N are nodes whose position assignments have a critical effect on the positioning of N's associated fiducial; this chain is accordingly called the "critical chain" of N. The critical chain can include both forward and reverse traversals of constraints. Suppose, for example, that in the fiducial graph of FIG. 9 the grid elements 1102, 1108, and 1110 have a low degree of elasticity, while the grid elements 1104 and 1106 have a higher degree of elasticity. Then the critical chain leading to the tail node of the graph (corresponding to fiducial 1156 ) would begin with the head node 1150 and continue through nodes 1154, 1152, and 1156, in that order. This chain involves the forward traversal of the constraints associated with grid elements 1102 and 1110 but the reverse traversal of the constraint associated with grid element 1108. This critical chain would be represented in the values of "prev" fields of NetworkGridNodes as follows: the "prev" field of node 1156 would point to node 1152, the "prev" field of node 1152 would point to node 1154, the "prev" field of node 1154 would point to node 1150, and the "prev" field of node 1150 would be null.

The actual assignment of positions to fiducials is performed in the method NetworkGridConstraint.propagate-set-fiducial, described in detail below as Algorithm 12. This algorithm generally works its way backward from the tail fiducial toward the head fiducial, assigning positions to fiducials that are closer to the tail fiducial first. Thus, if a fiducial F is a predecessor of a fiducial G (meaning that G can be reached from F in the partially reduced fiducial graph by traversing constraints in the forward direction only), a position will generally be assigned to G before assigning a position to F. However, if G precedes F in a critical chain (which is possible because a critical chain may involve the backward traversal of some constraints), the algorithm will assign a position to F before assigning a position to G.

Ideally, the position of each fiducial F would be set to the value P computed by P=HP+divide(EH, ET, TP−HP) where "EH" is the elastic-from-head value associated with F, "ET" is the elastic-to-tail value associated with F, "HP" is the position of the head fiducial of the partially reduced fiducial graph, "TP" is the position of the tail fiducial of the partially reduced fiducial graph, and "divide(. . .)" is the Elastic divide operation.

This computation is appealing because it uses the preferred sizes and elasticities that apply before and after the fiducial F to dictate how much of the space between the head and tail fiducials of the overall grid should be allocated before and after the position assigned to F. The Elastic divide operation computes the amount of this space that should be allocated before F, and the addition of HP to this value yields an actual position for F that leaves the desired amount of space between the head fiducial and F.

Unfortunately, there are various situations, particularly when the overall size allocated to the grid is less than the grid's preferred size, in which the positions yielded by this formula will violate the minimum sizes of one or more grid elements, and perhaps even yield negative sizes for one or more grid elements. Accordingly, several measures are taken to track explicitly the effects of elements' minimum sizes and the effects of positions that have already been assigned to some fiducials. Although the formula above captures the spirit of the computation that is performed, the computation according to an embodiment is modified to incorporate these measures before finally applying a modified version of the above formula in step (14) of Algorithm 12, described below.

According to one embodiment, these measures operate by computing several variables for each fiducial F in preparation for determining the position that will actually be assigned to F. These variables are the following:

"max-pred-pos" is the largest position that has been assigned to any immediate predecessor of F. In other words, this is the largest position that has been assigned to any fiducial H that is the head fiducial of a constraint whose tail fiducial is F. For example, for fiducial 1554 in FIG. 12, max-pred-pos will be the larger of the positions assigned to fiducials 1550 and 1552 (if positions have already been assigned to either of these fiducials).

"min-succ-pos" is the smallest position that has been assigned to any immediate successor of F. In other words, this is the smallest position that has been assigned to any fiducial T that is the tail fiducial of a constraint whose head fiducial is F. For example, for fiducial 1550 in FIG. 12, min-succ-pos will be the smallest of the positions assigned to fiducials 1552, 1554, and 1556 (leaving out any of these fiducials to which a position has not yet been assigned).

"low-limit" is the smallest position that can be assigned to F, given the known minimum-size constraints and the positions that have already been assigned to other fiducials, without violating the minimum size of any grid element. For example, for fiducial 1554 in FIG. 12, low-limit will be the greatest of The position assigned to fiducial 1548 (the head fiducial of the graph) plus the minimum size of the elastic-from-head value of fiducial 1554;

The position assigned to fiducial 1550 plus the minimum size of the Elastic associated with constraint 1512, if a position has already been assigned to fiducial 1550; and The position assigned to fiducial 1552 plus the minimum size of the Elastic associated with constraint 1516, if a position has already been assigned to fiducial 1552.

"high-limit" is the largest position that can be assigned to F, given the known minimum-size constraints and the positions that have already been assigned to other fiducials, without violating the minimum size of any grid element. For example, for fiducial 1550 in FIG. 12, high-limit will be the smallest of The position assigned to fiducial 1558 (the tail fiducial of the graph) minus the minimum size of the elastic-to-tail value of fiducial 1550;

The position assigned to fiducial 1552 minus the minimum size of the Elastic associated with constraint 1510, if a position has already been assigned to fiducial 1552;

The position assigned to fiducial 1554 minus the minimum size of the Elastic associated with constraint 1512, if a position has already been assigned to fiducial 1554; and The position assigned to fiducial 1556 minus the minimum size of the Elastic associated with constraint 1514, if a position has already been assigned to fiducial 1556.

The algorithm's primary goal of not assigning a negative size to any grid element will be achieved by assigning to F a position between max-pred-pos and min-succ-pos. The algorithm's secondary goal of not violating the minimum size of any grid element can be achieved by assigning to F a position between low-limit and high-limit. It is possible in some situations that violation of the minimum size will occur even if this policy is followed, since a complex fiducial graph could have indirect minimum-size constraints that do not become apparent soon enough to enable correct calculation of the low-limit and high-limit values. However, in the situations commonly encountered in practice, the computation of these values as described in Algorithm 12 is adequate.

The broad outlines of the procedure for assigning a position to a fiducial F are thus as follows:

1. Ensure that positions have been assigned to all fiducials whose positions should be assigned before the position of F is assigned.
2. Compute the values of max-pred-pos, min-succ-pos, low-limit, and high-limit.
3. If possible, use the calculation in step (14) of Algorithm 12 to assign a position to F that is greater than max-pred-pos and low-limit, and is less than min-succ-pos and high-limit. If this is not possible, then use various fallback strategies (implemented in steps (7) and (8) of Algorithm 12).

In detail according to one embodiment, the assignment of positions to fiducials in a partially reduced fiducial graph is requested by calling a method NetworkGridConstraint.set-fiducials, described by the pseudocode in Algorithm 11, after assigning the desired positions to head and tail fiducials of the graph. This method uses a helper method NetworkGridConstraint.propagate-set-fiducial, described by the pseudocode in Algorithm 12, which does most of the work.

Algorithm 11

According to one embodiment, the following is a definition of {ngc.set-fiducials} where ngc is a NetworkGridConstraint. Note that this method is called after positions have already been assigned to the head and tail fiducials of the network ngc.

1. For each NetworkGridNode n in ngc.nodemap, perform the following steps:
   Set n.marked to false.
   If ngc.fiducial equals neither ngc.head nor ngc.tail, mark n.fiducial as not yet having had a position assigned.
2. Remove all elements from ngc.disabled-back-links.
3. Call {ngc.propagate-stretch ngc.head}.
4. Remove all elements from ngc.disabled-back-links.
5. Call {ngc.reverse-propagate-stretch ngc.tail}.
6. Call {ngc.propagate-set-fiducial ngc.head}.
7. For each constraint c in ngc.components, call {c.set-fiducials} to ask c to set the positions of its internal fiducials.

Algorithm 11 orchestrates the assignment of positions to fiducials in a partially reduced fiducial graph by initializing the relevant data structures and then calling several other methods that do most of the work. In step (1) the "marked" fields of all nodes in the graph are set to false. Each node's "marked" field will be set to true when the computation of a position for that node's fiducial begins. Step (1) also marks the positions of all fiducials, except for the graph's head and tail fiducials, as being unassigned. This step erases the results of any previous assignments of positions to the affected fiducials.

Step (2) sets up for and step (3) calls the propagate-stretch method of Algorithm 8, to fill in the "prev" and elastic-from-head fields of every node. The values of these fields will reflect the already assigned positions of the head and tail fiducials of the graph. Therefore, these field values may differ from those computed when the propagate-stretch method was called earlier, during the computation of a size preference for the fiducial graph.

Step (4) sets up for and step (5) calls the reverse-propagate-stretch method to fill in the elastic-to-tail fields of every node. Then step (6) calls the propagate-set-fiducial method of Algorithm 12, below, to compute and assign positions for all fiducials that correspond to nodes in the partially reduced fiducial graph. This method call uses the field values computed during steps (3) and (5).

Finally, after positions have been assigned to all fiducials that correspond to nodes in the partially reduced fiducial graph, the results of those position assignments can be propagated to the constraints in the graph. Step (7) accordingly calls the set-fiducials method on each such constraint. If a constraint is a Series Composition constraint and/or contains any Series Composition constraints, this call will result in positions being assigned to the fiducials corresponding to the internal nodes of such Series Composition constraints.

Algorithm 12

According to one embodiment, the definition of {ngc.propagate-set-fiducial f}, where ngc is a NetworkGridConstraint and f is a fiducial includes the following:

1. Let n be ngc.nodemap[f], so n is the NetworkGridNode corresponding to f.
2. If n.marked is true, then return null.
3. Set n.marked to true.
   Let hpos be the position assigned to the fiducial ngc.head.
   Let tpos be the position assigned to the fiducial ngc.tail.
   Let min-from-head be the minimum size of n.elastic-from-head.
   Let min-to-tail be the minimum size of n.elastic-to-tail.
   Let max-pred-pos be hpos.
   Let min-succ-pos be tpos.
   Let low-limit be hpos+min-from-head.
   Let high-limit be tpos−min-to-tail.
4. For each constraint c in n.successors perform the following steps:
   A. Let ctail be the tail fiducial of c.
   B. If the position of ctail has not already been assigned, perform the following steps:
      i. Let ntail be ngc.nodemap[ctail], so ntail is the NetworkGridNode corresponding to ctail.
      ii. Determine whether ntail precedes n in a critical chain. This is done by starting with n and following the chain of prev links to see whether ntail is one of the NetworkGridNodes in the chain. As an optimization, check first whether ntail.prev equals n. If so, ntail cannot precede n in a critical chain because n precedes ntail in a critical chain.
      iii. If ntail does not precede n in a critical chain, then call {ngc.propagate-set-fiducial ctail}.
   C. If a position has been assigned to ctail and the position of f has not yet been assigned, then perform the following steps:
      i. Let ctpos be the position assigned to ctail.
      ii. If ctpos is less than min-succ-pos, set min-succ-pos to ctpos.
      iii. If ctpos is less than high-limit, set high-limit to ctpos.
5. For each constraint c in n.predecessors perform the following steps:
   A. Let chead be the head fiducial of c and let nhead be ngc.nodemap[chead].
   B. If nhead.prev equals n, then call {ngc.propagate-set-fiducial chead}.
   C. If the position of chead has already been assigned and the position of f has not yet been assigned, then perform the following steps:
      i. Let chpos be the position assigned to chead.
      ii. If chpos is greater than max-pred-pos, set max-pred-pos to chpos.
      iii. If chpos is greater than low-limit, set low-limit to chpos.
6. If the position of f has already been set, then return.
7. If high-limit<low-limit, then set high-limit to the minimum of low-limit and min-succ-pos and then set low-limit to the maximum of high-limit and max-pred-pos.
8. Check whether high-limit<low-limit.
   If so, let pos be (low-limit+high-limit)/2 and go to step (15).
   If not, continue with step (9).
9. Let ehigh be an Elastic whose minimum and preferred sizes are zero and whose elasticity is greater than that of any grid element.
10. For each constraint c in n.successors perform the following steps:
    A. Let ctail be the tail fiducial of c.
    B. If the position of ctail has already been assigned, then Let ce be the Elastic associated with the constraint c.

Let ctpos be the position assigned to ctail.

Let d be ctpos−high-limit.

Let de be a rigid Elastic whose minimum and preferred sizes are equal to d.

Let ee be ce-de, the Elastic difference of ce and de.

Set ehigh to max(ehigh, ee), the result of applying the Elastic max operation to ehigh and ee.

11. Let elow be n.elastic-from-head.
12. Let d be low-limit−hpos.

Let de be a rigid Elastic whose minimum and preferred sizes are equal to d.

Set elow to elow−de, the Elastic difference of elow and de.

13. For each constraint c in n.predecessors perform the following steps:

A. Let chead be the head fiducial of c.
    B. If the position of chead has already been assigned, then Let ce be the Elastic associated with the constraint c.

Let chpos be the position assigned to chead.

Let d be low-limit−chpos.

Let de be a rigid Elastic whose minimum and preferred sizes are equal to d.

Let ee be ce−de, the Elastic difference of ce and de.

Set elow to max(elow, ee), the result of applying the Elastic max operation to elow and ee.

14. Let amt be divide(elow, ehigh, high-limit-low-limit), where divide( . . . ) is the Elastic divide operation.

Let pos be low-limit+amt.
15. Assign pos as the position of the fiducial f.

The propagate-set-fiducial method described in Algorithm 12 is the workhorse method for assigning fiducial positions in a partially reduced fiducial graph. The method receives an argument f, which is a fiducial whose position should be assigned. The method ensures that positions are assigned to all fiducials whose positions should be assigned before a position is assigned to f by making a recursive call (in step (4Biii) or (5B)) for each such fiducial whose position has not already been assigned. Following this phase, in steps (7) through (15) the method computes a position for f that best reflects the influence of already positioned neighboring fiducials and the other available information about the cumulative effect of the various constraints in the graph.

In the initial call to this method from step (6) of Algorithm 11, f is the head fiducial of the graph. Through recursive calls, all fiducials in the graph will eventually be reached and their positions will be computed. However, these recursive calls need to be made at least once from each fiducial even if, as in the case of the head fiducial, the position of the fiducial has already been assigned. Otherwise, there is a risk that some parts of the partially reduced fiducial graph might not be reached by any recursive call. Accordingly, steps (1) through (5) of Algorithm 12 are executed once for every fiducial, even if its position has already been assigned. Steps (7) through (15), however, are skipped in the case of a fiducial whose position is already assigned.

The steps of Algorithm 12 are now described in detail. In step (1), the variable n is set to the NetworkGridNode object that is associated with the fiducial f. In step (2) the "marked" field of n is checked. If this field contains true, then a computation of a position for f is already in progress, so this method call simply returns. This situation can occur if a call to propagate-set-fiducial for f makes recursive calls which in turn make further recursive calls, one of which comes back to visit f. Since there is already a call that will ultimately assign a position to f, there is no need for the recursive call to do any work.

If execution reaches step (3), a commitment has been made that this method call will make the recursive calls from the fiducial f and will assign a position to f if necessary. The "marked" field of n is set to true so that any future calls to this method for f will return immediately in step (2). Continuing now in step (3), initial values are computed for a large number of variables used in subsequent steps:

"hpos" is the position already assigned to the head fiducial of the graph.

"tpos" is the position already assigned to the tail fiducial of the graph.

"m-from-head" is the minimum size of the elastic-from-head value for the fiducial f.

"min-to-tail" is the minimum size of the elastic-to-tail value for f.

The next four variables were already discussed above, before the presentation of Algorithms 11 and 12. These variables are initialized in this step and their values are then refined in subsequent steps:

"max-pred-pos" is initialized to the position of the head fiducial of the graph, since no fiducial should be assigned a position before that of the head fiducial.

"min-succ-pos" is initialized to the position of the tail fiducial of the graph, since no fiducial should be assigned a position after that of the tail fiducial.

"low-limit" is initialized to hpos+min-from-head; in other words, to the least position that can be assigned to the fiducial f without violating the minimum size of f's elastic-from-head value.

"high-limit" is initialized to tpos-min-to-tail, which is likewise the greatest position that can be assigned to f without violating the minimum size of f's elastic-to-tail value.

As a minor optimization, the initialization of the above variables could be omitted in the case where the position of f has already been assigned.

Execution then proceeds to step (4), in which each constraint that can be traversed forward from f is examined. For each such constraint c, step (4B) checks whether a position has already been assigned to ctail, the tail fiducial of c. If not, step (4Bii) determines whether a position should be assigned to ctail before a position has been assigned to f. As described above, ctail's position should be assigned before f's, except when ctail precedes f in a critical chain. Step (4Bii) determines whether this is the case, and step (4Biii) makes a recursive call to assign a position to ctail, except when ctail precedes f in a critical chain.

Figure 13:
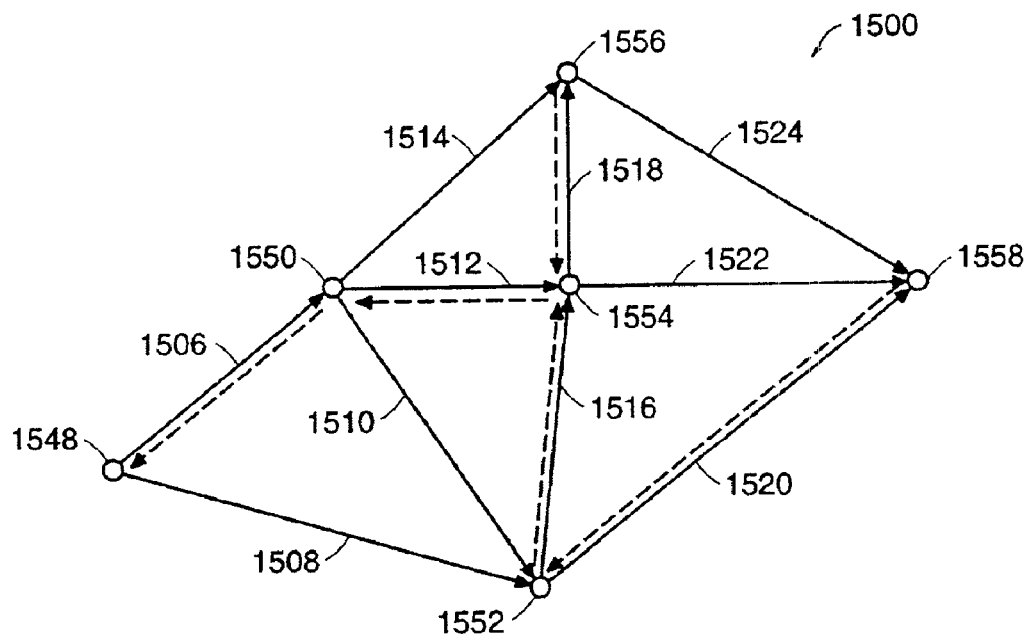
FIG. 13 is an example of a fiducial graph having critical chains.

For example, consider FIG. 13 which is an example of a fiducial graph having critical chains. In the graph 1500, dashed arrows are added to indicate the "prev" values of the various graph nodes for a certain hypothetical set of size preferences associated with the various constraints in the graph. If the "prev" field of a node A points to a node B, then FIG. 13 includes a dashed arrow pointing from node A to node B. For example, the dashed arrow from node 1552 to node 1554 in FIG. 13 indicates that the "prev" field of node 1552 points to node 1554. Traversing these dashed arrows in the reverse direction, there is a critical chain beginning with node 1548 and continuing through nodes 1550, 1554, 1552, and 1558. Another critical chain begins at node 1548 and continues through nodes 1550, 1554, and 1556.

When Algorithm 12 is applied to this graph and the propagate-set-fiducial method is called on the fiducial associated with node 1552, step (4Biii) will make a recursive call to assign a position to the successor node 1558 because node 1558 does not precede node 1552 in a critical chain. (In fact, node 1558 follows node 1552 in a critical chain.) However, step (4Biii) will not make a recursive call to assign a position to node 1554, even though node 1554 is a successor of node 1552, because node 1554 precedes node 1552 in a critical chain. The omission of this recursive call provides an opportunity for the position of node 1552 to be assigned before the position of node 1554, so that the position of node 1552 can be taken into account when assigning a position to node 1554, in recognition of their relative positions in the critical chain.

After step (4B), execution continues to step (4C). In this step, if a position has been assigned to ctail and a position needs to be assigned to f, the values of min-succ-pos and high-limit are reduced if the position assigned to ctail is less than the previously assigned value of either of these variables. This reduction ensures that the position assigned to f will not be greater than the position assigned to ctail.

Step (5) is similar to step (4) except that it considers constraints that can be traversed backward, rather than forward, from f. For each such constraint c, step (5B) checks whether there is a critical chain in which f is the immediate predecessor of chead, the head fiducial of c (determined by checking whether the "prev" field of nhead points to n). This is the only case in which a position should be assigned to chead before assigning a position to f; in this case, step (5B) makes a recursive call to assign a position to chead.

Again using the example in FIG. 13, if f is the fiducial associated with node 1554, step (5B) will not make a recursive call for node 1550 because node 1550 is a predecessor of node 1554 and the "prev" field of node 1550 does not point to node 1554. However, step (5B) does make a recursive call for the predecessor node 1552 because the "prev" field of node 1552 does point to node 1554. This call supports the goal of assigning positions to fiducials that follow f in a critical chain before assigning a position to f itself.

Finally, step (5C) is very similar to step (4C): if a position has been assigned to chead and not yet to f, the values of max-pred-pos and low-limit are increased if either variable is less than the position assigned to chead.

At the completion of step (5), all recursive calls that should occur have occurred. If a position has already been assigned to the fiducial f (for example, if f is the head or tail fiducial of the fiducial graph), then there is nothing left to do for f, so in this case step (6) simply returns from the propagate-set-fiducial call.

In some difficult situations in which not all constraints' minimum sizes can be respected, the value of high-limit may have become less than that of low-limit. In such a situation, the goal of respecting all constraints' minimum sizes must be abandoned. Accordingly, if step (7) finds that this is the situation, the values of these two variables are adjusted so that high-limit is no longer less than low-limit. However, high-limit is not allowed to become greater than min-succ-pos and low-limit is not allowed to become less than max-pred-pos. In the normal case, this adjustment will leave low-limit and high-limit equal to each other. Alternative embodiments for this case may include setting high-limit and low-limit to distinct values intermediate between max-pred-pos and min-succ-pos.

If in step (8) the value of high-limit is still less than that of low-limit, then it must be the case that max-pred-pos is greater than min-succ-pos. In this case, not even the goal of assigning fiducial positions that are in the proper order can be achieved. The response to this emergency is just to assign a position for f that is halfway between the low-limit and high-limit values, so that value is computed in this step and control then transfers to step (15) to assign the value as f's position. It should be emphasized, however, that this emergency situation should never occur unless the positions assigned to the head and tail fiducials of the fiducial graph are themselves out of the proper order.

If execution reaches step (9), the position that will be assigned to the fiducial f lies somewhere in the range bounded by low-limit and high-limit. Steps (9) through (13) calculate two Elastic values, ehigh and elow, that will be used in step (14) to calculate where in this range the position of f should actually be assigned. Steps (9) and (10) calculate ehigh and steps (11) through (13) calculate elow.

The Elastic value, ehigh, represents the combined size preferences of the constraints that link the fiducial f to all relevant fiducials that follow f and whose positions have already been assigned. The ultimate use of ehigh is in the divide operation of step (14), which positions f within the range bounded by low-limit and high-limit. Accordingly, ehigh needs to represent the size preference from f to a point whose position equals the value of high-limit.

Step (9) gives ehigh an initial, highly stretchy value in preparation for step (10), in which Elastics derived from the size preferences of the various constraints will be combined into ehigh using the Elastic max operation. Step (10) loops through the constraints that can be traversed forward from f. For each such constraint c whose tail fiducial has an assigned position, an Elastic value derived from that constraint will be combined into ehigh. This Elastic value, however, must represent the size preference from f to high-limit rather than the size preference from f to the tail fiducial of the constraint. Because of the adjustments to min-succ-pos and high-limit in steps (4Cii) and (4Ciii), high-limit is guaranteed to be less than or equal to the position assigned to the tail fiducial of the constraint c. Therefore, the size preference associated with c may need to be "shortened" by the distance between high-limit and the position assigned to c's tail fiducial.

Figure 14:
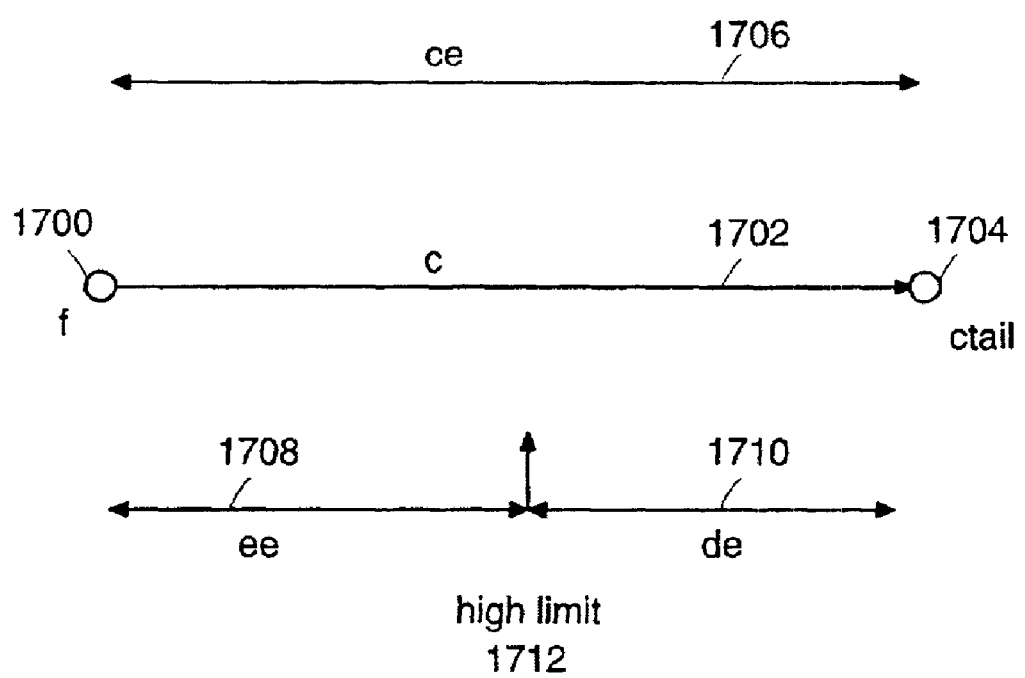
FIG. 14 is a diagram illustrating the shortening of a constraint's Elastic for step (10B) of Algorithm 12 according to one embodiment.

FIG. 14 is a diagram illustrating the shortening of a constraint's Elastic for step (10B) of Algorithm 12 according to one embodiment. FIG. 14 illustrates this situation, showing the fiducial f 1700 and the constraint c 1702. The Elastic value associated with constraint c 1702 is depicted as Elastic ce 1706 and the desired shortened Elastic is shown as Elastic ee 1708. By comparing this diagram with FIG. 10 it can be seen that a way to compute the desired Elastic ee 1708 would be to create an Elastic de 1710 representing the desired amount of shortening, and then subtract that Elastic de 1710 from Elastic ce 1706 using the Elastic subtract operation. From FIG. 14 it is apparent that Elastic de 1710 should represent the distance between high-limit 1712 and the assigned position of the fiducial ctail 1704 that is the tail fiducial of constraint c 1702.

Thus, step (10B) calculates the desired amount of shortening in the variable d and sets the variable de to a highly rigid Elastic value of that length. The variable ee is then set to the result of applying the Elastic subtract operation to ce and de, and finally this Elastic value ee is combined into ehigh using the Elastic max operation, as described above. The loop of step (10) repeats these operations for each constraint that can be traversed forward from f.

Note that the elastic-to-tail value for f is not used explicitly in steps (9) and (10). This value is used in step (2) and thus has an indirect effect by influencing the value of high-limit that is used in step (10), but f's elastic-to-tail is not used explicitly in steps (9) or (10) because, by the time these steps are reached, positions should already be assigned to the successor fiducials of f (except where such fiducials precede f in a critical chain) and it is expected that the information contained in f's elastic-to-tail value has already played its part during the assignment of positions to those successor fiducials. Accordingly, the computation of ehigh in steps (9) and (10) relies directly on these assigned positions and on the size preferences of f's successor constraints, rather than attempting to use f's elastic-to-tail value.

After step (10), execution continues to step (11), where computation of the Elastic value elow begins. This Elastic value is analogous to ehigh but should represent the size preference to the fiducial f from a point whose position equals the value of low-limit. In other respects, however, the situation on this side of f differs considerably from that on the high side of f. Most notably, although the positions of most fiducials on the high side of f will already have been assigned, the positions of most fiducials on the low side of f will not yet have been assigned; rather, the assignment of positions for those fiducials awaits the assignment of positions to their successor fiducials such as f. However, it is possible that certain predecessor fiducials of f already have assigned positions, either because such fiducials follow f in a critical chain or because positions were assigned to those fiducials before the beginning of the computation. It is desirable to take into account any such positions that have already been assigned, but since many predecessor fiducials will not yet have assigned positions, the elastic-from-head value associated with f is used to account for the size preferences accumulated along the various paths from the head fiducial that pass through those predecessor fiducials.

For example, in FIG. 13 during the computation of a position to the fiducial associated with node 1554, the fiducial associated with predecessor node 1552 will already have been assigned a position because it follows node 1554 in a critical chain, but the position of the fiducial associated with predecessor node 1550 will not yet have been computed. The elastic-from-head value of node 1554 will, however, include information about the size preferences of constraints along the paths from head node 1548 to node 1554, including the constraints connected to nodes such as node 1550 to which no position has yet been assigned.

According to an alternative embodiment, an even more precise assessment of the size preferences applying to fiducials at various stages of this computation could be achieved by recomputing all elastic-from-head and elastic-to-tail values every time a position is assigned to a fiducial. Except for the sharing of the NetworkGridNode.marked field between Algorithms 9 and 12, this could be done straightforwardly by repeating steps (2) through (5) of Algorithm 11 every time a fiducial's position is assigned.

Returning to the description of Algorithm 12, steps (11) and (12) initialize the Elastic value elow by taking the elastic-from-head value associated with the fiducial f and "shortening" it to account for the value of low-limit. This shortening is entirely analogous to the shortening depicted in FIG. 14 except that the Elastic de 1710 used for the shortening is now applied on the low side, rather than the high side, of the Elastic to be shortened. Step (11) sets elow as the elastic-from-head value associated with f. Since this value is measured from the head node of the fiducial graph to f, the amount by which this Elastic should be shortened should equal the distance from the position of this head node to the point whose position equals the value of low-limit. Step (12) accordingly computes this distance in the variable d and then subtracts a highly rigid Elastic value de of this length from the previously assigned value of elow using the Elastic subtract operation. These steps result in assigning to the variable elow the desired shortened Elastic representing a size preference from low-limit to the fiducial f.

Step (13) is analogous to step (10) except that step (13) loops through predecessor, rather than successor, fiducials. For each predecessor fiducial chead whose position is found to be already assigned, an Elastic value ee is computed based on the size preference along the constraint that connects chead and f, shortened to represent a size preference from low-limit to f. This Elastic value ee is then combined into elow using the Elastic max operation, as in step (10).

When all predecessors of the fiducial f have been considered, execution proceeds to step (14). This step computes in the variable pos the position to be assigned to f, using the Elastic divide operation to choose a value in the range bounded by low-limit and high-limit. The Elastics supplied to the divide operation are elow, which represents a size preference from low-limit to f, and ehigh, which represents a size preference from f to high-limit. By providing these two Elastics as operands to the divide operation along with the distance high-limit-low-limit, which is the size of the range of available positions, the computation computes in the variable amt the amount of that range that should be positioned before f in order to best reflect the information contained in these size preferences. This amount is then added to the numerical value of low-limit in order to calculate in the variable pos an actual position for the fiducial f.

Finally, in step (15) the position pos is actually assigned to the fiducial f, after which the propagate-set-fiducial method call returns. When all recursive propagate-set-fiducial calls spawned by the original call in step (6) of Algorithm 11 have returned, positions will thus have been assigned to all fiducials in the partially reduced fiducial graph.

Grid Layout Using Origins

In its most general form, the layout of graphical objects using elastics and three-pass layout negotiation computes not just the size of each object but also the position of an origin point within the object's bounds. The algorithms presented above can be extended to accommodate the processing of origins in grids. Two cases need to be addressed: the positioning of the origin points of grid elements and the positioning of origin points of grids themselves.

Grid elements that use origin points can be incorporated through a simple extension of the algorithms presented above. When a grid element is added to a grid, the element's origin point can optionally be connected to a vertical and/or a horizontal fiducial.

If the origin point of a given element is not connected to a fiducial along a grid dimension of interest, then the Leaf constraint corresponding to that element has an associated Elastic that is the total Elastic of the element along that dimension. This total Elastic will be the Elastic sum of the first and last components of the element's OriginElastic along that dimension. For a description of OriginElastic, see U.S. Patent Application Ser. No. 09/364,470, now U.S. Pat. No. 6,667,750, entitled "Multiple Pass Layout of Graphical Objects With Elastics," and additionally, see U.S. Patent Application Ser. No. 09/364,469, now U.S. Pat. No. 6,380,940, filed Jul. 30, 1999, entitled "Processing of Graphical Objects Having Origins Defined With Elasticity," by Robert H. Halstead, Jr. and David E. Hollingsworth, the entire teachings of which are incorporated herein by reference.

According to one embodiment, when a size is allocated to the Leaf constraint, the amount of space allocated to the portions of the element that lie before and after the element's origin point will be computed as follows:

before=divide(E.first, E.last, total)

after=total−before where

"E" is the OriginElastic describing the element's size preference along the dimension of interest;

"E.first" and "E.last" are the first and last components, respectively, of E;

"total" is the total amount of space allocated to the Leaf constraint;

"before" is the amount of space to be allocated to the element before (i.e., above or to the left of) its origin point;

"after" is the amount of space to be allocated to the element after (i.e., below or to the right of) its origin point; and divide( . . . ) is the Elastic divide operation.

This computation is very similar to the computation in step (14) of Algorithm 12 and has a very similar purpose: to divide up an available amount of space (whose size in this case is stored in the variable "total") according to the preferred sizes and elasticities of two Elastics representing size preferences for the portions of the object on the two sides of the origin point. This computation also resembles, both in its mechanism and in its purpose, the computation in Algorithm 4 for allocating space to the constraints contained in a Series Composition constraint.

If the origin point of a given element is connected to a fiducial along the grid dimension of interest, then the element will be attached to three fiducials: a fiducial A to which the "leading" (top or left) edge of the element is attached, a fiducial B to which the origin of the element is attached, and a fiducial C to which the "trailing" (bottom or right) edge of the element is attached. In this situation, there will still be a Leaf constraint connecting the fiducial A to the fiducial C, but two additional Leaf constraints are added to the fiducial graph for the element. One of these additional Leaf constraints connects the fiducial A to the fiducial B, while the other Leaf constraint connects the fiducial B to the fiducial C. The Elastic associated with the first of these additional Leaf constraints is the first component of the element's OriginElastic, while the Elastic associated with the second of these additional Leaf constraints is the last component of the element's OriginElastic. As an optimization, the overall Leaf constraint that connects the fiducials A and C may be omitted in the common case where the Elastic from A to C equals the Elastic sum of the Elastic from A to B and the Elastic from B to C.

The second extension to the algorithms for grid layout entails the addition of mechanisms to support the specification and use of an origin point for the grid itself. The following requirements need to be addressed:

A vertical and a horizontal fiducial must be associated with the origin point of the grid. Edges or origin points of grid elements can be attached to these fiducials in order to align the elements as desired with respect to the grid's origin point.

The size preference of the grid along each dimension must be computed as an OriginElastic whose first and last components reflect the size preferences of the contents of the grid that are attached on one side or the other of the origin point. The total of these first and last components must reflect the overall size preference of the grid along the dimension of interest.

The assignment of positions to fiducials must be capable of proceeding on the basis of a specified position of the grid's origin point between the head and tail fiducials of the grid.

Figure 15:
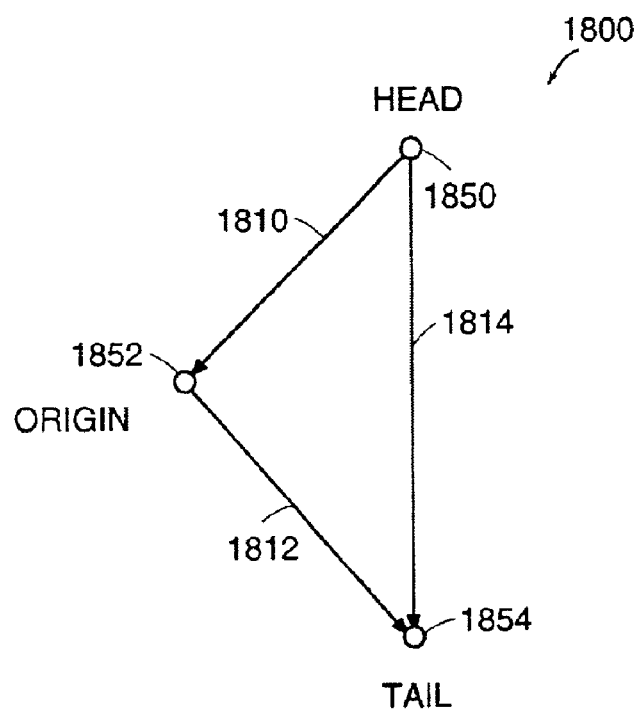
FIG. 15 is a fiducial graph including an origin node.

To compute grid layouts using origins, the concept of fiducial graphs must be extended so that a fiducial graph can have not only head and tail nodes but also an origin node. The rules for Algorithm 1, which produces the partially reduced fiducial graph, must be amended so that the origin node always remains a node of the partially reduced fiducial graph and is never absorbed into a Series Composition constraint as an internal node. FIG. 15 is a fiducial graph including an origin node. The graph 1800 is provided as an example. If no special treatment were given to the origin node 1852, step (3) of Algorithm 1 would absorb node 1852 along with constraints 1810 and 1812 into a single Series Composition constraint, eliminating origin node 1852 from the partially reduced fiducial graph.

To represent a partially reduced fiducial graph including an origin node, a new class called OriginGridConstraint is introduced. This class is a subclass of NetworkGridConstraint, so an OriginGridConstraint object inherits all the fields and methods of a NetworkGridConstraint object, including the methods described in Algorithms 7 through 12. In addition, an OriginGridConstraint object has another field:

"origin" is the fiducial object that corresponds to the origin node of the partially reduced fiducial graph.

Furthermore, OriginGridConstraint has a method OriginGridConstraint.get-origin-elastic that computes the OriginElastic value representing the size preferences of a partially reduced fiducial graph including an origin node according to the embodiment described in Algorithm 13, below.

Algorithm 13

According to one embodiment, the definition of {ogc.get-origin-elastic}, where ogc is an OriginGridConstraint includes the following:

1. For each constraint c in ogc.components, ask c to compute its associated Elastic.
2. Remove all elements from ogc.disabled-back-links.
3. Call {ogc.propagate-stretch ogc.head}.
4. Remove all elements from ogc.disabled-back-links.
5. Call {ogc.reverse-propagate-stretch ogc.tail}.
6. Let no be ogc.nodemap[ogc.origin].
   Let nt be ogc.nodemap[ogc.tail].
7. Let oe be an OriginElastic whose first component is equal to no.elastic-from-head and whose last component is equal to no.elastic-to-tail.
8. Adjust oe so that its total Elastic is equal to nt.elastic-from-head. This step uses the method for overriding Elastics.
9. Return oe.

Algorithm 13 is similar to Algorithm 7, except that since the get-origin-elastic method of Algorithm 13 needs to return a more detailed value than the get-elastic method of Algorithm 7, several additional steps are required in Algorithm 13. Notably, the OriginElastic computed by Algorithm 13 must contain information about size preferences between the origin point and both the head and tail fiducials of the grid. This information is easily available in the elastic-from-head and elastic-to-tail fields of the origin node in the partially reduced fiducial graph, but in order to prepare all this information it is necessary to call both the propagate-stretch method, which computes the elastic-from-head values, and the reverse-propagate-stretch method, which computes the elastic-to-tail values. This requirement contrasts with the simpler situation in Algorithm 7, where only the propagate-stretch method needs to be called.

Steps (1) through (3) of Algorithm 13 are identical to the corresponding steps of Algorithm 7. As in Algorithm 7, step (1) computes the Elastic value describing the size preference of each constraint; step (2) prepares for and step (3) calls the propagate-stretch method that computes the elastic-from-head value for every node in the partially reduced fiducial graph.

Steps (4) and (5) of Algorithm 13 have no counterpart in Algorithm 7. Step (4) prepares for and step (5) calls the reverse-propagate-stretch method that computes the elastic-to-tail value for every node in the partially reduced fiducial graph. This information is not needed in Algorithm 7 but is needed in step (7) of Algorithm 13.

Step (6) of Algorithm 13 sets the variables "no" and "nt" to the origin node and tail node of the partially reduced fiducial graph, respectively. Thus, for the graph 1800 shown in FIG. 18, the variable "no" would be set to the origin node 1852 and the variable "nt" would be set to the tail node 1854.

Step (7) creates an initial approximation to the desired result by creating an OriginElastic whose first component is the size preference from the head node to the origin node, and whose last component is the size preference from the origin node to the tail node. The values of these components are easily obtained by accessing the elastic-from-head and elastic-to-tail fields, respectively, of the origin node.

Figure 16:
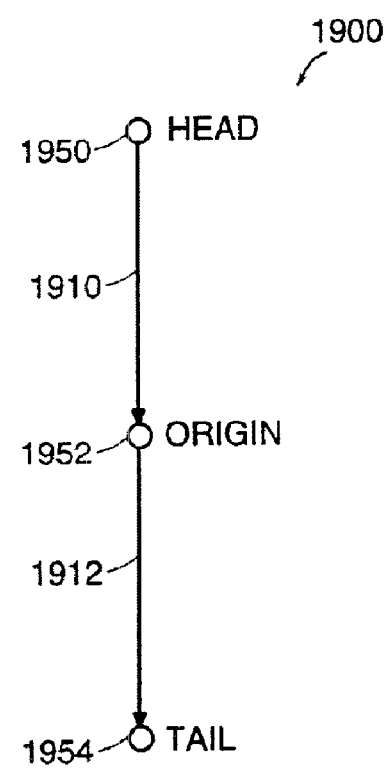
FIG. 16 is a simple fiducial graph having an origin node.

FIG. 16 is a simple fiducial graph having an origin node. In the graph 1900, the elastic-from-head value of the origin node 1952 is simply equal to the Elastic value representing the size preference of the constraint 1910 that connects the head node 1950 to the origin node 1952, and the elastic-to-tail value of the origin node 1952 is simply equal to the Elastic value representing the size preference of the constraint 1912 that connects the origin node 1952 to the tail node 1954. In this case it is apparent that the desired OriginElastic is one whose first and last components are exactly the values assigned in step (7).

However, in more complex graphs, such as the graph 1800 of FIG. 15, an adjustment may be necessary. The Elastic sum of the first and last components of the OriginElastic computed by Algorithm 13 must equal the overall size preference of the grid. The OriginElastic computed in step (7) already has this property for the graph 1900 and for any other graph in which all paths from the head node to the tail node pass through the origin node, but other fiducial graphs such as graph 1800 have paths (such as constraint 1814) from the head node to the tail node that do not pass through the origin node. In such graphs, it is possible that the paths that do not pass through the origin node result in a less compliant size preference than the paths that do pass through the origin node. For example, in graph 1800, the size preferences of constraints 1810 and 1812 might both be more compliant than the size preference of constraint 1814. In such a case, the OriginElastic computed in step (7) will have two compliant components that reflect the preferred sizes and elasticities associated with the constraints 1810 and 1812. The Elastic sum of these two values will have the same elasticity as the more compliant of these two values and therefore will be more compliant than the overall size preference of constraint 1814.

Step (8) of Algorithm 13 addresses this problem by adjusting the components of the OriginElastic value from step (7) so that the Elastic sum of the two components equals the Elastic value representing the overall size preference from the head node to the tail node of the partially reduced fiducial graph. In the previously described example involving graph 1800, the components of the OriginElastic value will thus be adjusted so that their Elastic sum equals the Elastic value representing the size preference of constraint 1814. The adjustment is performed by computing two Elastic values that sum to the desired overall Elastic value, while at the same time preserving, to the extent possible, the preferred sizes and elasticities of the component Elastic values relative to each other. A method for performing this adjustment is described in U.S. Patent Application Ser. No. 09/625,651, now abandoned, filed Jul. 26, 2000, entitled "Overriding Elastic Values For Graphical Objects," by Robert H. Halstead, Jr., which is a continuation-in-part of U.S. Patent Application Ser. No. 09/364,470, now U.S. Pat. No. 6,667,750, filed Jul. 30, 1999, entitled "Multiple Pass Layout of Graphical Objects With Elastics," by Robert H. Halstead, Jr. and David E. Hollingsworth, the entire contents of which are incorporated herein by reference.

At the conclusion of step (8), the desired OriginElastic has been computed in the variable "oe". Accordingly, step (9) simply returns this value as the result of the get-origin-elastic method call.

The process of assigning positions to fiducials in an OriginGridConstraint requires minor changes to handle the existence of a fiducial associated with a grid's origin point. The operation of the OriginGridConstraint.set-fiducials method is almost identical to the operation of the NetworkGridConstraint.set-fiducials method described in Algorithm 11. The only difference is that the processing in step (1) of Algorithm 11 is modified so that the origin fiducial, in addition to the head and tail fiducials, is marked as having had a position initially assigned.

As a straightforward extension of the capabilities described above for grid layout using origins, the capabilities for laying out tables such as those illustrated in FIGS. 1 and 2 can be augmented to permit the alignment of objects using their origins. The Table class implemented in the Curl programming language allows the specification in any row or column that the origins of table elements in that row or column should be aligned. An option specification such as valign="origin"

on a table row will cause the origins of table elements in that row to be aligned. The option can also be specified on an individual table element to cause its origin to be aligned with those of any similarly marked table elements in the same row. An "halign" option is similarly available for aligning origins of elements in table columns.

The implementation of the valign feature is straightforward: for every table row that has one or more elements whose origins are to be aligned, a fiducial in the underlying grid is created and the origins of the applicable elements are attached to that fiducial. The implementation of the halign feature in table columns is entirely analogous.

Figure 17:
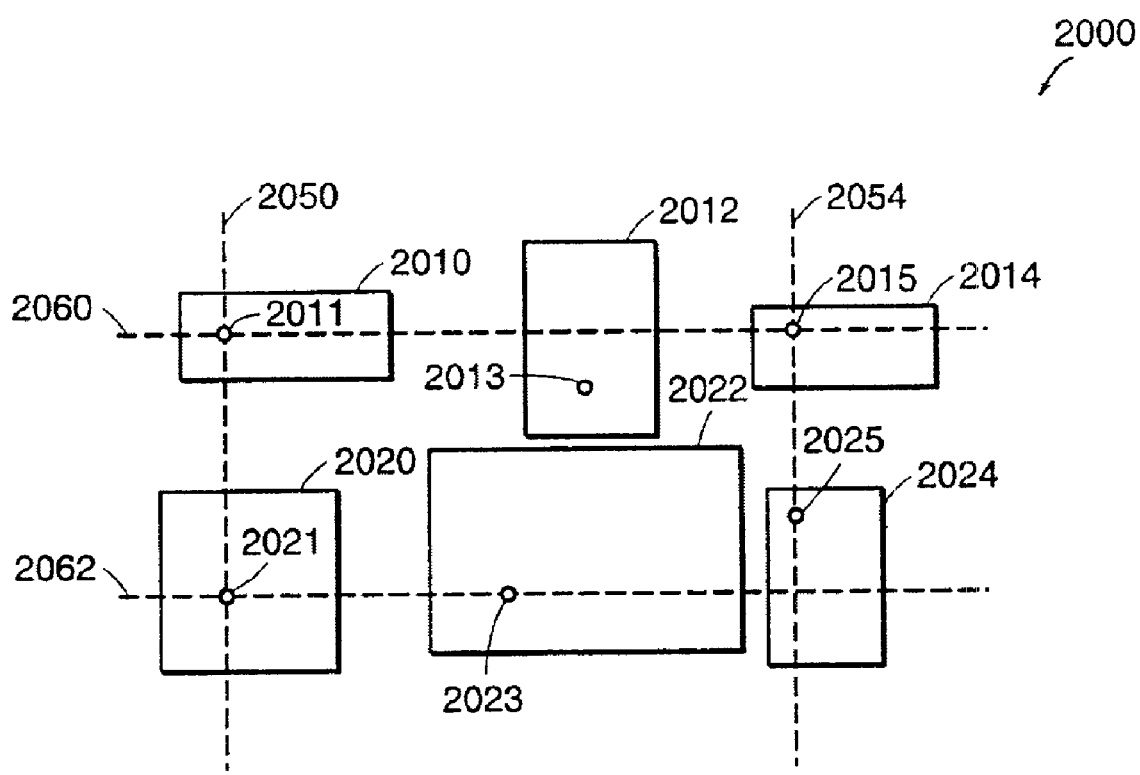
FIG. 17 is a table having the origins of some elements aligned.

FIG. 17 is a table having the origins of some elements aligned. The table 2000 shown in FIG. 17 illustrates various alignments that are possible. This table contains elements 2010, 2012, 2014, 2020, 2022, and 2024 arranged into two rows and three columns. Within the elements are origin points 2011, 2013, 2015, 2021, 2023, and 2025. In the first table row, the origins of elements 2010 and 2014 are aligned, while in the second row the origins of elements 2020 and 2022 are aligned. In the first column, the origins of elements 2010 and 2020 are aligned, while in the third column, the origins of elements 2014 and 2024 are aligned. There is no alignment of origins in the second table column. To implement these alignments, fiducials 2050, 2054, 2060, and 2062 are created in the grid that underlies table 2000 and the element origins are attached to these fiducials as indicated in FIG. 17. Note that an origin point can be attached to fiducials in both dimensions, as in the case of elements 2010, 2014, and 2020. Alternatively, an origin point can be attached only to a horizontal fiducial, as in the case of element 2022, or only to a vertical fiducial, as in the case of element 2024, or an origin point can be attached to no fiducials at all, as in the case of element 2012.

Those of ordinary skill in the art realize that methods involved in a system and method for processing grid layout may be embodied in a computer program product that includes a computer-usable medium. For example, such a computer usable medium can include a readable memory device, such as a hard drive device, a CD-ROM, a DVD-ROM, a computer diskette or solid-state memory components (ROM, RAM), having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing grid layout, comprising:
   generating a fiducial graph for a grid in a given dimension, the fiducial graph comprising fiducials and constraints of the grid, each constraint having a size preference, the size preference comprising a size and elastic properties;
   traversing the fiducial graph, combining the size preferences of the constraints into a size preference for the grid in the given dimension;
   assigning a size to the grid; and
   assigning positions to the grid fiducials by traversing the fiducial graph, allocating sizes within the grid size to the grid constraints in the given dimension.

2. The method of claim 1, wherein generating the fiducial graph further comprises:
   grouping constraints into parallel constraints if the constraints are between a pair of fiducials; and
   grouping constraints into series constraints if a first constraint is in series with a second constraint.

3. The method of claim 2, wherein the fiducial graph is a series-parallel fiducial graph and generating the fiducial graph further comprises:
   grouping constraints from the fiducial graph into a series-parallel composition tree having a root constraint being either a parallel or series constraint.

4. The method of claim 3, wherein combining the size preferences of the constraints into the size preference for the grid further comprises:
   computing a size preference for each constituent constraint of the series-parallel composition tree culminating with a size preference for the root constraint, the size preference of the root constraint being the size preference for the grid.

5. The method of claim 4, wherein computing the size preference for a parallel constraint comprises:
   applying a max operation to the size preferences of the constraints grouped within the parallel constraint.

6. The method of claim 4, wherein computing the size preference for a series constraint comprises:
   applying an add operation to the size preferences of the constraints grouped within the series constraint.

7. The method of claim 3, wherein assigning positions to the grid fiducials further comprises:
   allocating a size within the grid size to each constraint; and
   assigning a position to a fiducial such that the distance between the fiducial and a head fiducial of a constraint is the size of the constraint.

8. The method of claim 7, wherein allocating a size to each constraint comprises:
   dividing the grid size among each constituent constraint of the series-parallel composition tree, the size allocated to a constraint grouped within a parallel constraint being the size allocated to the parallel constraint, the size allocated to a constraint grouped within a series constraint being computed by applying a divide operation to size preferences of constituent constraints within the series constraint and to an overall size allocated to the constituent constraints within the series constraint.

9. The method of claim 1, wherein the fiducial graph is a non-series-parallel fiducial graph and combining the size preferences of the constraints into a size preference for the grid further comprises:
   assigning an initial size preference to each fiducial in the fiducial graph; and
   traversing constraints in forward and reverse traversals to accumulate size preferences at each fiducial, resulting in an accumulated size preference between each fiducial and a designated fiducial.

10. The method of claim 9, wherein the designated fiducial is the head fiducial of the grid, and the size preference of the grid is the accumulated size preference at the tail fiducial of the grid.

11. The method of claim 9, wherein the designated fiducial is the tail fiducial of the grid, and the size preference of the grid is the accumulated size preference at the head fiducial of the grid.

12. The method of claim 9, wherein accumulating size preferences comprises:
   combining the size preference of a fiducial with the size preference of a constraint having the fiducial as its head fiducial, resulting in a first resultant size preference;
   combining the first resultant size preference with the size preference of the tail fiducial of the constraint, resulting in a second resultant size preference; and
   replacing the size preference of the tail fiducial with the second resultant size preference if the second resultant size preference is different from the size preference of the tail fiducial.

13. The method of claim 12, wherein the first resultant size preference results from applying an add operation to the size preference of the fiducial and the size preference of the constraint.

14. The method of claim 12, wherein the second resultant size preference results from applying a max operation to the first resultant size preference and the size preference of the tail fiducial of the constraint.

15. The method of claim 9, wherein accumulating size preferences comprises:
   combining the size preference of a fiducial with the size preference of a constraint having the fiducial as its tail fiducial, resulting in a first resultant size preference;
   combining the first resultant size preference with the size preference of the head fiducial of the constraint, resulting in a second resultant size preference; and
   replacing the size preference of the head fiducial with the second resultant size preference if the second resultant size preference is different from the size preference of the head fiducial.

16. The method of claim 15, wherein the first resultant size preference results from applying a subtraction operation subtracting the size preference of the constraint from the size preference of the fiducial.

17. The method of claim 15, wherein the second resultant size preference results from applying a max operation to the first resultant size preference and the size preference of the head fiducial of the constraint.

18. The method of claim 9, wherein the fiducial graph is traversed until the accumulated size preference at each fiducial is constant.

19. The method of claim 9, wherein the initial size preference of the designated fiducial has rigid elastic properties.

20. The method of claim 9, wherein the initial size preference of a non-designated fiducial has stretchy elastic properties.

21. The method of claim 9, further comprising:
storing a set of back-links for each fiducial in the fiducial graph; and
adding a constraint to the set of back-links for a fiducial if a backward traversal of the constraint contributed to the accumulated size preference of the fiducial, each back-link preventing subsequent backward traversals of a constraint.

22. The method of claim 21, wherein preventing subsequent backward traversals of a constraint comprises:
storing a set of disabled back-links for the fiducial graph;
adding a constraint to the set of disabled back-links for the fiducial graph if a backward traversal is attempted from a fiducial on a constraint that is stored in a set of back-links associated with the fiducial; and
restarting calculation of the grid size preference, avoiding backward traversal of constraints in the set of disabled back-links.

23. The method of claim 9, further comprising:
for each fiducial, storing a predecessor fiducial in a chain of fiducials that contributed to the accumulated size preference of the fiducial.

24. The method of claim 9, further comprising:
marking fiducials during a forward or backward traversal to prevent loops in which a traversal path passes through a fiducial more than once.

25. The method of claim 9, further comprising:
sorting constraints in order of increasing elastic properties prior to traversal, traversing constraints that most rigidly constrain the size preferences of other fiducials first.

26. The method of claim 9, further comprising:
constraining the size preference of a fiducial having an assigned position, the size preference comprising rigid elastic properties and a minimum size and a preferred size both equal to the distance between the position of the designated fiducial and the assigned position of the fiducial.

27. The method of claim 1, wherein the fiducial graph is a non-series-parallel fiducial graph and assigning positions to the grid fiducials further comprises:
pre-assigning positions to the head and tail fiducials of the grid such that the distance between the head and tail fiducials is the size allocated to the grid;
traversing constraints in forward and reverse traversals accumulating size preferences at each fiducial, resulting in accumulated size preferences between each fiducial and the head fiducial and between each fiducial and the tail fiducial; and
assigning positions for each non-assigned fiducial such that a position for a fiducial is computed after computing positions for each non-assigned successor fiducial in critical chains extending from the fiducial.

28. The method of claim 27, further comprising:
assigning positions for each non-assigned fiducial such that a non-assigned fiducial is assigned a position after assigning a position for each successor fiducial that can be reached from the non-assigned fiducial by a forward traversal of a constraint, unless the successor fiducial precedes the non-assigned fiducial in a critical chain.

29. The method of claim 27, wherein computing a position for a fiducial comprises:
dividing the grid size between a first size preference and a second size preference resulting in an allocated size, the first size preference comprising the size preference between the non-assigned fiducial and the head fiducial, the second size preference comprising the size preference between the non-assigned fiducial and the tail fiducial, the allocated size being the distance between the head fiducial and the non-assigned fiducial; and
assigning a position to the non-assigned fiducial such that the distance between the non-assigned fiducial and the head fiducial is the allocated size.

30. The method of claim 27, further comprising:
pre-assigning a position to a grid origin fiducial in the given dimension.

31. The method of claim 27, wherein assigning a position for a non-assigned fiducial comprises:
constraining the position assigned to the non-assigned fiducial to be no less than a position assigned to a predecessor fiducial.

32. The method of claim 27, wherein assigning a position for a non-assigned fiducial comprises:
constraining the position assigned to the non-assigned fiducial to be no greater than a position assigned to a successor fiducial.

33. The method of claim 27, wherein assigning a position for a non-assigned fiducial comprises:
constraining the position assigned to the non-assigned fiducial to be no less than a position assigned to a predecessor fiducial plus a minimum size of the size preference associated with a constraint between the fiducial and the predecessor fiducial.

34. The method of claim 27, wherein assigning a position for a non-assigned fiducial comprises:
constraining the position assigned to the non-assigned fiducial to be no greater than a position assigned to a successor fiducial minus a minimum size of the size preference associated with the constraint between the fiducial and the successor fiducial.

35. The method of claim 27, wherein assigning a position for a non-assigned fiducial comprises:
constraining the position assigned to the non-assigned fiducial to be no less than a position assigned to the head fiducial plus a minimum size of the size preference from the head fiducial to the fiducial.

36. The method of claim 27, wherein assigning a position for a non-assigned fiducial comprises:
constraining the position assigned to the non-assigned fiducial to be no greater than a position assigned to the tail fiducial minus a minimum size of the size preference to the tail fiducial from the fiducial.

37. The method of claim 1, wherein a grid element has an origin coupled to a fiducial in the given dimension, and the fiducial graph comprises a first constraint and a second constraint for the grid element, the first constraint having a size preference from a head fiducial of the grid element to the origin, the second constraint having a size preference from the origin to a tail fiducial of the grid element.

38. The method of claim 1, wherein a grid element has an origin not coupled to a fiducial in the given dimension, and the fiducial graph comprises a constraint for the grid element having a total size preference being a result of applying an add operation to a first size preference and a second size preference, the first size preference being a size preference from a head fiducial of the grid element to the origin, and the second size preference being a size preference from the origin to a tail fiducial of the grid element, the method further comprising:

dividing a total size allocated to the grid element between the first size preference and the second size preference resulting in an allocated size; and assigning a position to the origin in the given dimension such that the distance between the origin and the head fiducial of the grid element is the allocated size.

39. The method of claim 1, wherein the grid further comprises an origin, the fiducial graph comprising an origin fiducial in the given dimension, further comprising:

computing a size preference from the head fiducial of the grid to the origin fiducial; and computing a size preference from the origin fiducial to the tail fiducial of the grid.

40. The method of claim 39, further comprising:

adjusting the size preferences before and after the origin fiducial such that the result of applying an add operation to the size preferences equals the size preference from the head fiducial to the tail fiducial of the grid.

41. The method of claim 1, wherein the grid represents a table having table elements, each table element having an origin in the given dimension further comprising:

aligning the origins of one or more table elements in the given dimension by creating a fiducial in the underlying grid and attaching the origins of the one or more table elements to the fiducial.

42. A system for processing grid layout, comprising:

a layout processor, the layout processor generating a fiducial graph for a grid in a given dimension, the fiducial graph comprising fiducials and constraints of the grid, each constraint having a size preference, the size preference comprising a size and elastic properties;

the layout processor traversing the fiducial graph, combining the size preferences of the constraints into a size preference for the grid in the given dimension;

the layout processor assigning a size to the grid; and the layout processor assigning positions to the grid fiducials by traversing the fiducial graph, allocating sizes within the grid size to the grid constraints in the given dimension.

43. The system of claim 42, wherein the fiducial graph is a series-parallel fiducial graph and the layout processor generating a fiducial graph further comprises:

the layout processor grouping constraints from the fiducial graph into a series-parallel composition tree having a root constraint being either a parallel or series constraint.

44. The system of claim 43, wherein the layout processor combining the size preferences of the constraints into the size preference for the grid further comprises:

the layout processor computing a size preference for each constituent constraint of the series-parallel composition tree culminating with a size preference for the root constraint, the size preference of the root constraint being the size preference for the grid.

45. The system of claim 44, wherein the layout processor computing the size preference for a parallel constraint comprises:

the layout processor applying a max operation to the size preferences of the constraints grouped within the parallel constraint.

46. The system of claim 44, wherein the layout processor computing the size preference for a series constraint comprises:

the layout processor applying an add operation to the size preferences of the constraints grouped within the series constraint.

47. The system of claim 43, wherein the layout processor assigning positions to the grid fiducials further comprises:

the layout processor allocating a size within the grid size to each constraint; and the layout processor assigning a position to a fiducial such that the distance between the fiducial and a head fiducial of a constraint is the size of the constraint.

48. The system of claim 47, wherein the layout processor allocating a size to each constraint comprises:

the layout processor dividing the grid size among each constituent constraint of the series-parallel composition tree, the size allocated to a constraint grouped within a parallel constraint being the size allocated to the parallel constraint, the size allocated to a constraint grouped within a series constraint being computed by the layout processor applying a divide operation to size preferences of constituent constraints within the series constraint and to an overall size allocated to the constituent constraints within the series constraint.

49. The system of claim 42, wherein the fiducial graph is a non-series-parallel fiducial graph and the layout processor combining the size preferences of the constraints into a size preference for the grid further comprises:

the layout processor assigning an initial size preference to each fiducial in the fiducial graph; and the layout processor traversing constraints in forward and reverse traversals to accumulate size preferences at each fiducial, resulting in an accumulated size preference between each fiducial and a designated fiducial.

50. The system of claim 49, wherein the layout processor accumulating size preferences comprises:

the layout processor combining the size preference of a fiducial with the size preference of a constraint having the fiducial as its head fiducial, resulting in a first resultant size preference;

the layout processor combining the first resultant size preference with the size preference of the tail fiducial of the constraint, resulting in a second resultant size preference; and the layout processor replacing the size preference of the tail fiducial with the second resultant size preference if the second resultant size preference is different from the size preference of the tail fiducial.

51. The system of claim 49, wherein the layout processor accumulating size preferences comprises:

the layout processor combining the size preference of a fiducial with the size preference of a constraint having the fiducial as its tail fiducial, resulting in a first resultant size preference;

the layout processor combining the first resultant size preference with the size preference of the head fiducial of the constraint, resulting in a second resultant size preference; and the layout processor replacing the size preference of the head fiducial with the second resultant size preference if the second resultant size preference is different from the size preference of the head fiducial.

52. The system of claim 51, wherein the first resultant size preference results from the layout processor applying a subtraction operation subtracting the size preference of the constraint from the size preference of the fiducial.

53. The system of claim 49, further comprising:

the layout processor storing a set of back-links for each fiducial in the fiducial graph; and the layout processor adding a constraint to the set of back-links for a fiducial if a backward traversal of the constraint contributed to the accumulated size preference of the fiducial, each back-link preventing subsequent backward traversals of a constraint.

54. The system of claim 49, further comprising:

for each fiducial, the layout processor storing a predecessor fiducial in a chain of fiducials that contributed to the accumulated size preference of the fiducial.

55. The system of claim 49, further comprising:

the layout processor marking fiducials during a forward or backward traversal to prevent loops in which a traversal path passes through a fiducial more than once.

56. The system of claim 49, further comprising:

the layout processor sorting constraints in order of increasing elastic properties prior to traversal, the layout processor traversing constraints that most rigidly constrain the size preferences of other fiducials first.

57. The system of claim 49, further comprising:

the layout processor constraining the size preference of a fiducial having an assigned position, the size preference comprising rigid elastic properties and a minimum size and a preferred size both equal to the distance between the position of the designated fiducial and the assigned position of the fiducial.

58. The system of claim 42, wherein the fiducial graph is a non-series-parallel fiducial graph and the layout processor assigning positions to the grid fiducials further comprises:

the layout processor pre-assigning positions to the head and tail fiducials of the grid such that the distance between the head and tail fiducials is the size allocated to the grid;

the layout processor traversing constraints in forward and reverse traversals accumulating size preferences at each fiducial, resulting in accumulated size preferences between each fiducial and the head fiducial and between each fiducial and the tail fiducial; and the layout processor assigning positions for each non-assigned fiducial such that a position for a fiducial is computed after computing positions for each non-assigned successor fiducial in critical chains extending from the fiducial.

59. The system of claim 42, wherein a grid element has an origin coupled to a fiducial in the given dimension, and the fiducial graph comprises a first constraint and a second constraint for the grid element, the first constraint having a size preference from a head fiducial of the grid element to the origin, the second constraint having a size preference from the origin to a tail fiducial of the grid element.

60. The system of claim 42, wherein a grid element has an origin not coupled to a fiducial in the given dimension, and the fiducial graph comprises a constraint for the grid element having a total size preference being a result of the layout processor applying an add operation to a first size preference and a second size preference, the first size preference being a size preference from a head fiducial of the grid element to the origin, and the second size preference being a size preference from the origin to a tail fiducial of the grid element, the system further comprising:

the layout processor dividing a total size allocated to the grid element between the first size preference and the second size preference resulting in an allocated size; and the layout processor assigning a position to the origin in the given dimension such that the distance between the origin and the head fiducial of the grid element is the allocated size.

61. The system of claim 42, wherein the grid further comprises an origin, the fiducial graph comprising an origin fiducial in the given dimension, further comprising:

the layout processor computing a size preference from the head fiducial of the grid to the origin fiducial; and the layout processor computing a size preference from the origin fiducial to the tail fiducial of the grid.

62. The system of claim 42, wherein the grid represents a table having table elements, each table element having an origin in the given dimension further comprising:

the layout processor aligning the origins of one or more table elements in the given dimension by creating a fiducial in the underlying grid and attaching the origins of the one or more table elements to the fiducial.

63. A computer program product comprising:

a computer-usable medium;

a set of computer operating instructions embodied on the medium, including instructions for processing grid layout, comprising instructions for:

generating a fiducial graph for a grid in a given dimension, the fiducial graph comprising fiducials and constraints of the grid, each constraint having a size preference, the size preference comprising a size and elastic properties;

traversing the fiducial graph, combining the size preferences of the constraints into a size preference for the grid in the given dimension;

assigning a size to the grid; and assigning positions to the grid fiducials by traversing the fiducial graph, allocating sizes within the grid size to the grid constraints in the given dimension.

64. The computer program product of claim 63, wherein the fiducial graph is a series-parallel fiducial graph and the instructions for generating the fiducial graph comprise further instructions for:

grouping constraints from the fiducial graph into a series-parallel composition tree having a root constraint being either a parallel or series constraint.

65. The computer program product of claim 64, wherein the instructions for combining the size preferences of the constraints into the size preference for the grid comprise further instructions for:

computing a size preference for each constituent constraint of the series-parallel composition tree culminating with a size preference for the root constraint, the size preference of the root constraint being the size preference for the grid.

66. The computer program product of claim 64, wherein the instructions for assigning positions to the grid fiducials comprise further instructions for:

allocating a size within the grid size to each constraint; and assigning a position to a fiducial such that the distance between the fiducial and a head fiducial of a constraint is the size of the constraint.

67. The computer program product of claim 63, wherein the fiducial graph is a non-series-parallel fiducial graph and the instructions for combining the size preferences of the constraints into a size preference for the grid comprise further instructions for:

assigning an initial size preference to each fiducial in the fiducial graph; and traversing constraints in forward and reverse traversals to accumulate size preferences at each fiducial, resulting in an accumulated size preference between each fiducial and a designated fiducial.

68. The computer program product of claim 67, wherein the instructions for accumulating size preferences comprise further instructions for:

combining the size preference of a fiducial with the size preference of a constraint having the fiducial as its head fiducial, resulting in a first resultant size preference;

combining the first resultant size preference with the size preference of the tail fiducial of the constraint, resulting in a second resultant size preference; and replacing the size preference of the tail fiducial with the second resultant size preference if the second resultant size preference is different from the size preference of the tail fiducial.

69. The computer program product of claim 67, wherein the instructions for accumulating size preferences comprise further instructions for:

combining the size preference of a fiducial with the size preference of a constraint having the fiducial as its tail fiducial, resulting in a first resultant size preference;

combining the first resultant size preference with the size preference of the head fiducial of the constraint, resulting in a second resultant size preference; and replacing the size preference of the head fiducial with the second resultant size preference if the second resultant size preference is different from the size preference of the head fiducial.

70. The computer program product of claim 67, further comprising instructions for:

storing a set of back-links for each fiducial in the fiducial graph; and adding a constraint to the set of back-links for a fiducial if a backward traversal of the constraint contributed to the accumulated size preference of the fiducial, each back-link preventing subsequent backward traversals of a constraint.

71. The computer program product of claim 67, further comprising instructions for:

for each fiducial, storing a predecessor fiducial in a chain of fiducials that contributed to the accumulated size preference of the fiducial.

72. The computer program product of claim 67, further comprising instructions for:

marking fiducials during a forward or backward traversal to prevent loops in which a traversal path passes through a fiducial more than once.

73. The computer program product of claim 63, wherein the fiducial graph is a non-series-parallel fiducial graph and the instructions for assigning positions to the grid fiducials comprise further instructions for:

pre-assigning positions to the head and tail fiducials of the grid such that the distance between the head and tail fiducials is the size allocated to the grid;

traversing constraints in forward and reverse traversals accumulating size preferences at each fiducial, resulting in accumulated size preferences between each fiducial and the head fiducial and between each fiducial and the tail fiducial; and assigning positions for each non-assigned fiducial such that a position for a fiducial is computed after computing positions for each non-assigned successor fiducial in critical chains extending from the fiducial.

74. The computer program product of claim 63, wherein a grid element has an origin coupled to a fiducial in the given dimension, and the fiducial graph comprises a first constraint and a second constraint for the grid element, the first constraint having a size preference from a head fiducial of the grid element to the origin, the second constraint having a size preference from the origin to a tail fiducial of the grid element.

75. The computer program product of claim 63, wherein a grid element has an origin not coupled to a fiducial in the given dimension, and the fiducial graph comprises a constraint for the grid element having a total size preference being a result of applying an add operation to a first size preference and a second size preference, the first size preference being a size preference from a head fiducial of the grid element to the origin, and the second size preference being a size preference from the origin to a tail fiducial of the grid element, further comprising instructions for:

dividing a total size allocated to the grid element between the first size preference and the second size preference resulting in an allocated size; and assigning a position to the origin in the given dimension such that the distance between the origin and the head fiducial of the grid element is the allocated size.

76. The computer program product of claim 63, wherein the grid further comprises an origin, the fiducial graph comprising an origin fiducial in the given dimension, further comprising instructions for:

computing a size preference from the head fiducial of the grid to the origin fiducial; and computing a size preference from the origin fiducial to the tail fiducial of the grid.

77. The computer program product of claim 63, wherein the grid represents a table having table elements, each table element having an origin in the given dimension, further comprising instructions for:

aligning the origins of one or more table elements in the given dimension by creating a fiducial in the underlying grid and attaching the origins of the one or more table elements to the fiducial.

78. A computer data signal embodied in a carrier wave comprising a code segment for processing grid layout, the code segment comprising instructions for:

generating a fiducial graph for a grid in a given dimension, the fiducial graph comprising fiducials and constraints of the grid, each constraint having a size preference, the size preference comprising a size and elastic properties;

traversing the fiducial graph, combining the size preferences of the constraints into a size preference for the grid in the given dimension;

assigning a size to the grid; and assigning positions to the grid fiducials by traversing the fiducial graph, allocating sizes within the grid size to the grid constraints in the given dimension.

79. The computer data signal of claim 78, wherein the fiducial graph is a series-parallel fiducial graph and the instructions of the code segment for generating the fiducial graph comprise further instructions for:

grouping constraints from the fiducial graph into a series-parallel composition tree having a root constraint being either a parallel or series constraint.

80. The computer data signal of claim 79, wherein the instructions of the code segment for combining the size preferences of the constraints into the size preference for the grid comprise further instructions for:

computing a size preference for each constituent constraint of the series-parallel composition tree culminating with a size preference for the root constraint, the size preference of the root constraint being the size preference for the grid.

81. The computer data signal of claim 79, wherein the instructions of the code segment for assigning positions to the grid fiducials comprise further instructions for:

allocating a size within the grid size to each constraint; and assigning a position to a fiducial such that the distance between the fiducial and a head fiducial of a constraint is the size of the constraint.

82. The computer data signal of claim 78, wherein the fiducial graph is a non-series-parallel fiducial graph and the instructions of the code segment for combining the size preferences of the constraints into a size preference for the grid comprise further instructions for:

assigning an initial size preference to each fiducial in the fiducial graph; and traversing constraints in forward and reverse traversals to accumulate size preferences at each fiducial, resulting in an accumulated size preference between each fiducial and a designated fiducial.

83. The computer data signal of claim 82, wherein the instructions of the code segment for accumulating size preferences comprise further instructions for:

combining the size preference of a fiducial with the size preference of a constraint having the fiducial as its head fiducial, resulting in a first resultant size preference;

combining the first resultant size preference with the size preference of the tail fiducial of the constraint, resulting in a second resultant size preference; and replacing the size preference of the tail fiducial with the second resultant size preference if the second resultant size preference is different from the size preference of the tail fiducial.

84. The computer data signal of claim 82, wherein the instructions of the code segment for accumulating size preferences comprise further instructions for:

combining the size preference of a fiducial with the size preference of a constraint having the fiducial as its tail fiducial, resulting in a first resultant size preference;

combining the first resultant size preference with the size preference of the head fiducial of the constraint, resulting in a second resultant size preference; and replacing the size preference of the head fiducial with the second resultant size preference if the second resultant size preference is different from the size preference of the head fiducial.

85. The computer data signal of claim 78, wherein the fiducial graph is a non-series-parallel fiducial graph and the instructions of the code segment for assigning positions to the grid fiducials comprise further instructions for:

pre-assigning positions to the head and tail fiducials of the grid such that the distance between the head and tail fiducials is the size allocated to the grid;

traversing constraints in forward and reverse traversals accumulating size preferences at each fiducial, resulting in accumulated size preferences between each fiducial and the head fiducial and between each fiducial and the tail fiducial; and assigning positions for each non-assigned fiducial such that a position for a fiducial is computed after computing positions for each non-assigned successor fiducial in critical chains extending from the fiducial.

86. The computer data signal of claim 78, wherein a grid element has an origin coupled to a fiducial in the given dimension, and the fiducial graph comprises a first constraint and a second constraint for the grid element, the first constraint having a size preference from a head fiducial of the grid element to the origin, the second constraint having a size preference from the origin to a tail fiducial of the grid element.

87. The computer data signal of claim 78, wherein a grid element has an origin not coupled to a fiducial in the given dimension, and the fiducial graph comprises a constraint for the grid element having a total size preference being a result of applying an add operation to a first size preference and a second size preference, the first size preference being a size preference from a head fiducial of the grid element to the origin, and the second size preference being a size preference from the origin to a tail fiducial of the grid element, the code segment further comprising instructions for:

dividing a total size allocated to the grid element between the first size preference and the second size preference resulting in an allocated size; and assigning a position to the origin in the given dimension such that the distance between the origin and the head fiducial of the grid element is the allocated size.

88. The computer data signal of claim 78, wherein the grid further comprises an origin, the fiducial graph comprising an origin fiducial in the given dimension, the code segment further comprising instructions for:

computing a size preference from the head fiducial of the grid to the origin fiducial; and computing a size preference from the origin fiducial to the tail fiducial of the grid.

89. The computer data signal of claim 78, wherein the grid represents a table having table elements, each table element having an origin in the given dimension, the code segment further comprising instructions for:

aligning the origins of one or more table elements in the given dimension by creating a fiducial in the underlying grid and attaching the origins of the one or more table elements to the fiducial.

* * * * *